US012732858B2

(12) United States Patent

Jin et al.

(10) Patent No.: US 12,732,858 B2

(45) Date of Patent: Sep. 8, 2026

(54) DATA TRANSMISSION METHOD AND COMMUNICATIONS APPARATUS

(71) Applicant: HUAWEI TECHNOLOGIES CO., LTD., Shenzhen (CN)

(72) Inventors: Hui Jin, Shenzhen (CN); Fenghui Dou, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 342 days.

(21) Appl. No.: 18/501,073

(22) Filed: Nov. 3, 2023

(65) Prior Publication Data

US 2024/0080709 A1 Mar. 7, 2024

Related U.S. Application Data

(63) Continuation of application No. PCT/CN2022/083793, filed on Mar. 29, 2022.

(30) Foreign Application Priority Data

May 8, 2021 (CN) ........................ 202110498723.9
May 31, 2021 (CN) ........................ 202110604819.9

(51) Int. Cl.
*H04W 28/02* (2009.01)
*H04W 76/20* (2018.01)

(52) U.S. Cl.
CPC ....... *H04W 28/0268* (2013.01); *H04W 76/20* (2018.02)

(58) Field of Classification Search
CPC ............. H04W 28/0268; H04W 76/20; H04W 28/0263; H04W 4/80; H04W 76/11; H04W 76/15; H04W 76/12; H04W 28/10; H04W 28/24; H04N 21/4126; H04N 21/43637
See application file for complete search history.

(56) References Cited

U.S. PATENT DOCUMENTS

| | | | |
|---|---|---|---|
| 12,375,888 B2 * | 7/2025 | Kim ........................ | H04W 4/08 |
| 2019/0191467 A1 | 6/2019 | Dao et al. | |
| 2020/0015079 A1 * | 1/2020 | Li ........................... | H04W 8/08 |
| 2020/0045753 A1 * | 2/2020 | Dao ........................ | H04W 4/08 |
| 2021/0105196 A1 | 4/2021 | Dao et al. | |

(Continued)

FOREIGN PATENT DOCUMENTS

CN 111837422 A 10/2020

OTHER PUBLICATIONS

International Search Report issued in corresponding International Application No. PCT/CN2022/083793, dated May 30, 2022, pp. 1-10.

(Continued)

*Primary Examiner* — Eunsook Choi

(74) *Attorney, Agent, or Firm* — HAUPTMAN HAM, LLP

(57) ABSTRACT

A data transmission method includes receiving information about a first quality of service (QoS) flow from a first access and mobility management function (AMF) network element, and receiving the data of the first service by a second QoS flow. The first QoS flow is useable by a second terminal device to receive data of a first service. The first AMF network element is configured to serve a first terminal device. The second QoS flow is determined based on the information about the first QoS flow.

20 Claims, 9 Drawing Sheets

(56) References Cited

U.S. PATENT DOCUMENTS

| | | | | |
|---|---|---|---|---|
| 2021/0250801 | A1* | 8/2021 | Van Der Velde | H04W 28/082 |
| 2022/0022089 | A1* | 1/2022 | Zhu | H04W 56/001 |
| 2022/0225438 | A1* | 7/2022 | Suh | H04W 76/16 |
| 2023/0180038 | A1* | 6/2023 | Chen | H04W 24/08<br>370/252 |
| 2023/0319514 | A1* | 10/2023 | Kim | H04W 4/08<br>370/312 |
| 2023/0397072 | A1* | 12/2023 | Prabhakar | H04L 69/322 |

OTHER PUBLICATIONS

Extended European Search Report issued in corresponding European Application No. 22806333.5, dated Jul. 23, 2024, pp. 1-10.

* cited by examiner

DATA TRANSMISSION METHOD AND COMMUNICATIONS APPARATUS

CROSS-REFERENCE TO RELATED APPLICATION

This application is a continuation of International Application No. PCT/CN2022/083793, filed on Mar. 29, 2022, which claims priority to Chinese Patent Application No. 202110498723.9, filed on May 8, 2021, and Chinese Patent Application No. 202110604819.9, filed on May 31, 2021, the aforementioned patent applications are hereby incorporated by reference in their entireties.

TECHNICAL FIELD

This application relates to the communications field, and more specifically, to a data transmission method and a communications apparatus in the communications field.

BACKGROUND

With development of electronic technologies, terminal devices are increasing and mutual data transmission may be performed between different terminal devices. For example, different terminal devices may complete data transfer by interacting with an application server. For example, UE 1 establishes a connection to the application server, and the UE 1 downloads data; and when a user needs to transfer data from the UE 1 to UE 2, the UE 1 disconnects the connection to the application server, and the UE 2 may establish a connection to the application server and download data by using the established connection. Because it takes a specific time for the UE 2 to re-establish the connection to the application server and download the data, a data transmission delay exists, causing poor user experience.

SUMMARY

One or more embodiments of the present application provide a data transmission method and a communications apparatus, to reduce a transmission delay and improve user experience.

According to a first aspect, a data transmission method is provided. The method is applied to a first terminal device, and the method includes:

receiving information about a first QoS flow from a first AMF network element, where the first QoS flow is used by a second terminal device to receive data of a first service, and the first AMF network element is an AMF network element serving the first terminal device; and receiving the data of the first service by using a second QoS flow, where the second QoS flow is determined based on the information about the first QoS flow.

In some embodiments, the first terminal device may perform transmission of the data of the first service by using the second QoS flow, where the second QoS flow is obtained based on the information about the first QoS flow, and the first QoS flow is used by the second terminal device to receive the data of the first service, that is, the second terminal device receives the data of the first service by using the first QoS flow. In this way, the first terminal device can receive the data of the first service by using the second QoS flow that is obtained based on the information about the first QoS flow, so that the data of the first service may be transferred from the second terminal device to the first terminal device, to implement transfer of the data of the first service. In other words, the information about the first QoS flow may be sent to the first terminal device by using a core network element (for example, the first AMF network element), to implement transfer of the data of the first service. This avoids a delay caused because the first terminal device needs to re-establish a connection to an application server and downloads the data of the first service when the data of the first service is transferred from the second terminal device to the first terminal device, and improves user experience.

Optionally, the second terminal device receives first data of the first service by using the first QoS flow, and the first terminal device may receive second data of the first service by using the second QoS flow, where the first data and the second data may be different data. Optionally, before the first terminal device receives the second data of the first service by using the second QoS flow, the second terminal device receives the first data of the first service by using the first QoS flow. After the first terminal device receives the second data of the first service by using the second QoS flow, the second terminal device stops using the first QoS flow to receive the data of the first service. In this way, a receive end of the data of the first service may change, in a seamless joint manner, from the second terminal device to the first terminal device. After the transfer, the second terminal device may exit to avoid overheads caused by required continuous participation of the second terminal device, thereby reducing power consumption of the second terminal device.

Optionally, the first service may be media, the first terminal device is a mobile phone, and the second terminal device is a television. The mobile phone may project played media to the television for playing. Before the media is played on the television, the mobile phone receives, by using the first QoS flow, data of the media sent by a core network element of the mobile phone, and plays the data. After the television obtains the second QoS flow by using the information about the first QoS flow, the television may receive the data of the media by using the second QoS flow, and the mobile phone exits from the media playing. In this way, power consumption of the mobile phone can be reduced. This can also reduce a delay caused when the television needs to re-establish a connection to an application server corresponding to the media and downloads the data.

Optionally, the first terminal device may determine the second QoS flow based on the information about the first QoS flow.

Optionally, the first QoS flow corresponds to a first PDU session, that is, the first QoS flow is a QoS flow in the first PDU session, or the first QoS flow belongs to the first PDU session; and the second QoS flow corresponds to a second PDU session, that is, the second QoS flow is a QoS flow in the second PDU session, or the second QoS flow belongs to the second PDU session. Optionally, the first PDU session is different from the second PDU session. In this way, a PDU session for transmission of the data of the first service may be transferred from the first PDU session to the second PDU session, that is, transfer between different PDU sessions may be implemented. Optionally, the first PDU session is the same as the second PDU session, so that transfer in a same PDU session may also be implemented.

Optionally, the first QoS flow is a QoS flow between the second terminal device and a second UPF network element of the second terminal device; and the second QoS flow is a QoS flow between the first terminal device and a first UPF network element of the first terminal device. The first UPF network element and the second UPF network element may be a same network element or different network elements.

Optionally, the first UPF network element of the first terminal device may send the data of the first service to the first terminal device by using the second QoS flow.

Optionally, the method further includes: establishing the second QoS flow based on the information about the first QoS flow. In other words, after obtaining the information about the first QoS flow, the first terminal device does not need to determine whether there is a PDU session or a QoS flow corresponding to the information about the first QoS flow, but directly establishes the second QoS flow by using the information about the first QoS flow.

It may be understood that, one QoS flow belongs to one PDU session, and establishing the second QoS flow may be understood as establishing a second PDU session and establishing the second QoS flow in the second PDU session.

In some embodiments, the method further includes: determining, based on the information about the first QoS flow, whether there is a PDU session and/or a QoS flow corresponding to the information about the first QoS flow; and sending, based on whether there is a PDU session and/or a QoS flow corresponding to the information about the first QoS flow, a PDU session modification request message or a PDU session establishment request message to the first AMF network element.

In some embodiments, situations are different depending on whether there is a PDU session corresponding to the information about the first QoS flow, or whether there is a QoS flow corresponding to the information about the QoS flow. Messages sent by the first terminal device to the first AMF network element are different in different situations. If there is a PDU session corresponding to the information about the first QoS flow, the first terminal device sends the PDU session modification request message to the first AMF network element. If there is no PDU session corresponding to the information about the first QoS flow, the first terminal device sends the PDU session establishment request message to the first AMF network element. In this way, flexibility can be improved.

In some embodiments, the information about the first QoS flow includes at least one of first description information of a first protocol data unit PDU session corresponding to the first QoS flow or second description information of the first QoS flow.

Optionally, the first description information includes at least one of a data network name DNN of the first PDU session, a session and service continuity SSC mode of the first PDU session, and single network slice selection assistance information S-NSSAI of the first PDU session.

Optionally, the second description information includes at least one of a quality of service identifier of the first QoS flow, a guaranteed bit rate of the first QoS flow, a guaranteed flow bit rate of the first QoS flow, a maximum flow bit rate of the first QoS flow, or an averaging window of the first QoS flow.

In some embodiments, the determining, based on the information about the first QoS flow, whether there is a PDU session and/or a QoS flow corresponding to the information about the first QoS flow includes:

- if the information about the first QoS flow includes the first description information, determining, based on the first description information, whether there is a PDU session corresponding to the first description information; or
- if the information about the first QoS flow includes the second description information, determining, based on the second description information, whether there is a QoS flow corresponding to the second description information; or
- if the information about the first QoS flow includes the first description information and the second description information, determining, based on the first description information, whether there is a PDU session corresponding to the first description information, and determining, based on the second description information, whether there is a QoS flow corresponding to the second description information.

Optionally, the first terminal device determines, in established PDU sessions, whether there is a PDU session whose description information is consistent with the first description information. If the PDU session exists, the first terminal device may determine that there is a PDU session corresponding to the first description information, and the existent PDU session corresponding to the first description information is a second PDU session; otherwise, there is no second PDU session. Optionally, the first terminal device determines, in established QoS flows, whether there is a QoS flow whose description information is consistent with the second description information. If the QoS flow exists, the first terminal device may determine that there is a QoS flow corresponding to the second description information, and the existent QoS flow corresponding to the second description information is the second QoS flow.

In some embodiments, the first terminal device may determine, based on the first description information, whether there is a PDU session corresponding to the first description information, and/or determine, based on the second description information, whether there is a QoS flow corresponding to the second description information. If there is a PDU session corresponding to the first description information, there is no need to re-establish a PDU session, so that signaling overheads can be reduced, and a design can be simplified. If there is a QoS flow corresponding to the second description information, there is no need to re-establish a QoS flow, so that signaling overheads can be reduced, and a design can be simplified.

In some embodiments, the sending, based on whether there is a PDU session and/or a QoS flow corresponding to the information about the first QoS flow, a PDU session modification request message or a PDU session establishment request message to the first AMF network element includes:

- if it is determined that there is a PDU session corresponding to the first description information but no QoS flow corresponding to the second description information, sending the PDU session modification request message to the first AMF network element, where the PDU session modification request message includes the second description information, and the second description information is used to establish the second QoS flow.

In some embodiments, if the first terminal device determines that there is a PDU session corresponding to the first description information but no QoS flow corresponding to the second description information, the existent PDU session corresponding to the first description information is the second PDU session, and the first terminal device determines that the second QoS flow corresponding to the second description information needs to be established in the second PDU session.

In some embodiments, the sending, based on whether there is a PDU session and/or a QoS flow corresponding to the information about the first QoS flow, a PDU session modification request message or a PDU session establishment request message to the first AMF network element includes:

if it is determined that there is no PDU session corresponding to the first description information, sending the PDU session establishment request message to the first AMF network element, where the PDU session establishment request message includes the first description information, the first description information is used to establish a second PDU session corresponding to the second QoS flow; and sending the PDU session modification request message to the first AMF network element, where the PDU session modification request message includes the second description information, and the second description information is used to establish the second QoS flow.

In some embodiments, if the first terminal device determines that there is no PDU session corresponding to the first description information, the first terminal device sends the PDU session establishment request message to the first AMF network element, where the first description information included in the PDU session establishment request message is used to establish the second PDU session corresponding to the second QoS flow. After the second PDU session is established, the first terminal device may send the PDU session modification request message to the first AMF network element. Then the second QoS flow is established by using the second description information included in the PDU session modification request message. In other words, the second PDU session may be first established and then the second QoS flow is established.

In some embodiments, the sending, based on whether there is a PDU session and/or a QoS flow corresponding to the information about the first QoS flow, a PDU session modification request message or a PDU session establishment request message to the first AMF network element includes:

if it is determined that there is no PDU session corresponding to the first description information, sending the PDU session establishment request message to the first AMF network element, where the PDU session establishment request message includes the first description information and the second description information, the first description information is used to establish a second PDU session corresponding to the second QoS flow, and the second description information is used to establish the second QoS flow.

In some embodiments, if the first terminal device determines that there is no PDU session corresponding to the first description information, the first terminal device sends the PDU session establishment request message to the first AMF network element, where the first description information included in the PDU session establishment request message is used to establish the second PDU session, and the second description information included in the PDU session establishment request message is used to establish the second QoS flow. In other words, the second QoS flow and the second PDU session may be simultaneously established.

In some embodiments, the sending, based on whether there is a PDU session and/or a QoS flow corresponding to the information about the first QoS flow, a PDU session modification request message or a PDU session establishment request message to the first AMF network element includes:

if it is determined that there is a PDU session corresponding to the first description information and there is a QoS flow corresponding to the second description information, sending the PDU session modification request message to the first AMF network element, where the PDU session modification request message is used to update a packet filter corresponding to the second QoS flow.

In some embodiments, if there is a PDU session corresponding to the first description information and a QoS flow corresponding to the second description information, the first terminal device sends the PDU session modification request message to the first AMF network element to update the packet filter. For example, the PDU session modification request message carries a second packet filter.

Optionally, the information about the first QoS flow may not include the first description information, but may include only the second description information. In this case, transfer in a same PDU session may be implemented. To be specific, a terminal device that receives data of the first service needs to be transferred from the second terminal device to the first terminal device, and related information about a PDU session does not need to be carried in a message.

In some embodiments, the method further includes: receiving a first packet filter of the first service sent by the first AMF network element, where the first packet filter includes a first internet protocol IP address of the first PDU session corresponding to the first QoS flow;

changing the first IP address in the first packet filter to a second IP address of the second PDU session corresponding to the second QoS flow, to obtain a second packet filter; and sending the second packet filter to the first AMF network element.

In some embodiments, the first terminal device may change the first IP address of the first PDU session included in the first packet filter to the second IP address of the established second PDU session. In other words, the first terminal device has a function of modifying the first packet filter, and then sends the second packet filter that is obtained through modification to the first AMF network element, so that the first AMF network element sends the second packet filter to the first UPF network element by using the first SMF network element. Then the first UPF network element may send the data of the first service to the first terminal device based on the second packet filter, thereby making it possible to transfer the data of the first service.

Optionally, a QoS rule corresponding to the first QoS flow may include the first packet filter, and a QoS rule corresponding to the second QoS flow may include the second packet filter. In other words, the first terminal device may receive a QoS rule corresponding to the first QoS flow, where the QoS rule corresponding to the first QoS flow includes the first packet filter; and the first terminal device may send a QoS rule corresponding to the second QoS flow to the first AMF network element, where the QoS rule corresponding to the second QoS flow includes the second packet filter.

Optionally, if the first PDU session and the second PDU session are a same PDU session, that is, data transmission may be performed by using different QoS flows of a same PDU session, the step in which the first terminal device modifies the first packet filter may not exist. In other words, in this case, the first terminal device may not modify the first packet filter to obtain the second packet filter; and the first AMF network element does not need to send the first packet filter to the first terminal device, but the first AMF network element may send the first packet filter to the first UPF network element by using the first SMF network element, that is, the first UPF network element may send the data of the first service to the first terminal device simply by using the first packet filter.

In some embodiments, the PDU session modification request message may carry the second packet filter.

In some embodiments, if the second PDU session already exists, the PDU session modification request message sent by the first terminal device to the first AMF network element may carry the second packet filter. Optionally, if the second PDU session does not exist, the second packet filter may be sent to the first AMF network element after the second PDU session is established.

In some embodiments, the method further includes: receiving a first identifier sent by the first AMF, where the first identifier is used to identify information related to the information about the first QoS flow; and if the first terminal device sends the PDU session modification request message or the PDU session establishment request message to the first AMF network element, sending the first identifier to the first AMF network element.

In some embodiments, the first AMF network element may allocate the first identifier to the first terminal device, where the first identifier is used to identify the information related to the information about the first QoS flow. If the first terminal device sends the PDU session modification request message or the PDU session establishment request message to the first AMF network element, the first terminal device also sends the first identifier to the first AMF network element. In this way, the first AMF network element may determine, based on the first identifier, the information related to the information about the first QoS flow, to avoid a case, in which the first AMF network element needs to first send the information related to the information about the first QoS flow to the first terminal device, and then the first terminal device sends the information to the first AMF network element. The information related to the information about the first QoS flow may be useless for the first terminal device, but the first AMF network element needs to obtain the information related to the information about the first QoS flow. Therefore, to avoid that, after receiving the PDU session modification request message or the PDU session establishment message, the first AMF network element cannot associate the PDU session modification request message or the PDU session establishment message with the information related to the information about the first QoS flow, the first identifier may be used for association of these association relationships.

Optionally, the information related to the information about the first QoS flow may include identification information of a second SMF network element corresponding to the first QoS flow and/or identification information of the second UPF network element corresponding to the first QoS flow. If the first AMF network element receives the PDU session establishment request message, the first AMF network element needs to determine, based on the PDU session establishment request message, an SMF network element and a UPF network element for the second PDU session to be newly established. The first AMF network element preferentially determines the second SMF network element corresponding to the first QoS flow as the first SMF network element for the second PDU session to be newly established, and determines the second UPF network element corresponding to the first QoS flow as the first UPF network element for the second PDU session to be newly established. In this way, a design may be simplified.

Optionally, when the first terminal device sends the PDU session modification request message or the PDU session establishment request message to the first AMF network element and also sends the first identifier to the first AMF network element, the first terminal device may simultaneously send the first identifier and the PDU session modification request message, or simultaneously send the first identifier and the PDU session establishment request message.

In some embodiments, the method further includes: obtaining a second identifier and/or a third identifier in response to a first operation instruction, where the second identifier is used to identify the first service, and the third identifier is used to identify the second terminal device; and sending the third identifier and/or the second identifier to the first AMF network element.

In some embodiments, a user may operate the first terminal device; and after receiving a first operation instruction of the user, the first terminal device is triggered to obtain the second identifier and/or the third identifier of the second terminal device. In this way, a possible application scenario is provided.

Optionally, the identifier of the second terminal device may be a GUAMI of the second terminal device or a TMSI of the second terminal device.

In some embodiments, the obtaining a third identifier includes: obtaining the third identifier from the second terminal device; or obtaining the third identifier from a management network element, where the management network element is configured to manage the first terminal device and the second terminal device.

In some embodiments, the first terminal device may obtain the third identifier from the second terminal device, or obtain the third identifier from the management network element.

Optionally, that the first terminal device obtains the third identifier from the second terminal device includes: The first terminal device obtains the third identifier from the second terminal device by using Bluetooth, Wi-Fi, or sidelink. Optionally, that the first terminal device obtains the third identifier from a management network element includes: The first terminal device obtains the third identifier from the management network element by using Bluetooth, Wi-Fi, or sidelink.

In some embodiments, the first service corresponds to a first application. Optionally, the second identifier identifies the first application, and the first service is identified by identifying the first application, where the first service is all services corresponding to the first application, that is, all services of the first application need to be transferred from the second terminal device to the first terminal device. Optionally, the first service identified by the second identifier is one service of the first application, that is, one service of the first application needs to be transferred from the second terminal device to the first terminal device.

In some embodiments, the method further includes: sending a fourth identifier to the second terminal device, where the fourth identifier is used to identify the first terminal device.

According to a second aspect, a data transmission method is provided, where the method is applicable to a first access and mobility management function AMF, the first AMF is a network element serving a first terminal device, and the method includes:

obtaining information about a first quality of service QoS flow from a second AMF network element, where the first QoS flow is used by a second terminal device to receive data of a first service, and the second AMF network element is a network element serving the second terminal device; and sending the information about the first QoS flow to the first terminal device, where the information about the first QoS flow is used to obtain a second QoS flow, and the second QoS flow is used by the first terminal device to receive the data of the first service.

In some embodiments, the first AMF network element may obtain the information about the first QoS flow from the second AMF network element, and send the obtained information about the first QoS flow to the first terminal device, so that the first terminal device obtains the second QoS flow based on the information about the first QoS flow, and the first terminal device receives the data of the first service by using the second QoS flow. In other words, the second terminal device receives the data of the first service by using the first QoS flow; and the first terminal device can receive the data of the first service by using the second QoS flow that is obtained based on the information about the first QoS flow. In this way, the data of the first service may be transferred from the second terminal device to the first terminal device, to implement transfer of the data of the first service. In other words, the information about the first QoS flow is sent to the first terminal device by using the first AMF network element, to implement transfer of the data of the first service. This avoids a delay caused because the first terminal device needs to re-establish a connection to an application server and downloads the data of the first service when the data of the first service is transferred from the second terminal device to the first terminal device, and improves user experience.

Optionally, the second AMF network element and the first AMF network element may be a same network element or different network elements.

In some embodiments, the method further includes:

receiving a PDU session modification request message or a PDU session establishment request message that is sent by the first terminal device based on the information about the first QoS flow; and sending the PDU session modification request message or the PDU session establishment request message to a first SMF network element, where the first SMF network element is an SMF network element serving the first terminal device.

Optionally, if the first AMF network element receives the PDU session modification request message, the first AMF network element may forward the PDU session modification request message to the first SMF network element, and the first SMF network element modifies a second PDU session; or if the first AMF network element receives the PDU session establishment request message, the first AMF network element may first determine a first SMF network element, and then send the PDU session establishment request message to the determined first SMF network element, and the first SMF network element establishes a second PDU session based on the PDU session establishment request message.

In some embodiments, the information about the first QoS flow includes at least one of first description information of a first protocol data unit PDU session corresponding to the first QoS flow or second description information of the first QoS flow.

Optionally, the first description information includes at least one of a data network name DNN of the first PDU session, a session and service continuity SSC mode of the first PDU session, and single network slice selection assistance information S-NSSAI of the first PDU session.

Optionally, the second description information includes at least one of a quality of service identifier of the first QoS flow, a guaranteed bit rate of the first QoS flow, a guaranteed flow bit rate of the first QoS flow, a maximum flow bit rate of the first QoS flow, or an averaging window of the first QoS flow.

In some embodiments, the PDU session modification request message includes the second description information, and the second description information is used to establish the second QoS flow.

Optionally, after receiving the PDU session modification request message, the first AMF network element sends the PDU session modification request message to the first SMF network element. The first SMF network element determines, based on the PDU session modification request message, that a PDU session corresponding to the PDU session modification request message is a second PDU session. The first SMF network element establishes, based on the second description information included in the PDU session modification request message, the second QoS flow in the second PDU session.

In some embodiments, the PDU session modification request message is used to update a packet filter of the second QoS flow.

Optionally, the PDU session modification request message includes a second packet filter. After receiving the PDU session modification request message, the first AMF network element sends the PDU session modification request message to the first SMF network element. The first SMF network element determines, based on the PDU session modification request message, that a PDU session corresponding to the PDU session modification request message is a second PDU session. The first SMF network element sends the second packet filter included in the PDU session modification request message to the first UPF network element.

In some embodiments, the PDU session establishment request message includes the first description information, the first description information is used to establish a second PDU session corresponding to the second QoS flow, the PDU session modification request message includes the second description information, and the second description information is used to establish the second QoS flow.

Optionally, after receiving the PDU session establishment request message, the first AMF network element sends the PDU session establishment request message to the first SMF network element, and the first SMF network element establishes a second PDU session based on the first description information included in the PDU session establishment request message. After the second PDU session is established, the first AMF network element receives a PDU session modification request message for the second PDU session, and the first AMF network element sends the PDU session modification request message to the first SMF network element; and the first SMF network element establishes, based on the second description information included in the PDU session modification request message, the second QoS flow in the second PDU session.

In some embodiments, the PDU session establishment request message includes the first description information and the second description information, the first description information is used to establish a second PDU session corresponding to the second QoS flow, and the second description information is used to establish the second QoS flow.

Optionally, after receiving the PDU session establishment request message, the first AMF network element sends the PDU session establishment request message to the first SMF network element; and the first SMF network element establishes, based on the first description information and the second description information that are included in the PDU session establishment request message, a second PDU session and the second QoS flow.

In some embodiments, the method further includes:

sending a first packet filter of the first service to the first terminal device, where the first packet filter includes a first internet protocol IP address of the first PDU session corresponding to the first QoS flow;

receiving a second packet filter of the first terminal device, where the second packet filter includes a second IP address of the second PDU session; and sending the second packet filter to the first session management function SMF network element.

In some embodiments, the first AMF network element may send, to the first SMF network element, the received second packet filter sent by the first terminal device, so that the first SMF network element sends the second packet filter to the first UPF network element, and the first UPF network element may send the data of the first service to the first terminal device based on the second packet filter.

Optionally, the first SMF network element may obtain a third packet filter based on the second packet filter, and the first SMF network element sends the third packet filter to the first UPF network element.

Optionally, the first SMF network element may exchange a source IP address and a port number corresponding to the source IP address that are included in the second packet filter, with a destination IP address and a port number corresponding to the destination IP address that are included in the second packet filter, to obtain the third packet filter.

In some embodiments, the second packet filter is carried in the PDU session modification request message.

In some embodiments, the method further includes: obtaining, from the second AMF network element, identification information of a second SMF network element of the second terminal device and/or identification information of a second user plane function UPF network element of the second terminal device, where the identification information of the second SMF network element is used to identify the second SMF network element, the identification information of the second UPF network element is used to identify the second UPF network element, the second SMF network element is an SMF network element serving the second terminal device, and the second UPF network element is a UPF network element serving the second terminal device;

sending a first identifier to the first terminal device; and receiving the first identifier from the first terminal device; and based on the received first identifier, determining the second SMF network element as the first SMF network element of the first terminal device, and/or determining the second UPF network element as the first UPF network element of the first terminal device.

In some embodiments, the first AMF network element receives the identification information of the second SMF network element and the identification information of the second UPF network element, and the first AMF network element may send the first identifier to the first terminal device. After the first AMF network element receives the first identifier, the first AMF network element determines the second SMF network element as the first SMF network element of the first terminal device, and/or the first AMF network element determines the second UPF network element as the first UPF network element of the first terminal device. In this way, a design may be simplified.

Optionally, the first identifier is used to indicate that the second UPF network element and/or the second SMF network element are/is related to the information about the first QoS flow.

Optionally, the first AMF network element may obtain, in a same message from the second AMF network element, the identification information of the second SMF network element of the second terminal device, the identification information of the second user plane function UPF of the second terminal device, the first description information, and/or the second description information. In other words, the first AMF network element receives the first description information and/or the second description information, and may associate the first description information and/or the second description information with the identification information of the second SMF network element and the identification information of the second UPF network element. The first AMF network element may send the first identifier to the first terminal device to identify these association relationships.

In some embodiments, the method further includes: sending the second IP address of the second PDU session corresponding to the second QoS flow and/or a third IP address of the first UPF network element of the first terminal device to the second AMF network element.

In some embodiments, after the second QoS flow is determined, the first UPF network element corresponding to the second QoS flow is also determined. The first AMF network element may send the second IP address of the second PDU session corresponding to the second QoS flow and/or a third IP address of the first UPF network element to the second AMF network element; the second AMF network element may send the second IP address of the second PDU session and/or the third IP address of the first UPF network element to the second SMF network element; and the second SMF network element sends the second IP address of the second PDU session and/or the third IP address of the first UPF network element to the second UPF network element, so that the second UPF network element changes a destination address of the data of the first service to the second IP address, and sends the data of the first service to the first UPF network element.

In some embodiments, the method further includes: receiving a second identifier from the second AMF network element, where the second identifier is used to identify the first service; and sending the second identifier to the first terminal device.

In some embodiments, the first AMF network element may receive, from the second AMF network element, the second identifier that identifies the first service, and send the second identifier to the first terminal device. The first terminal device may start in advance, based on the second identifier, a first application related to the first service, to prepare for receiving the data of the first service. This helps reduce a transmission delay, and avoids a case in which the first terminal device does not start the first application related to the first service until the data of the first service arrives at the first terminal device.

In some embodiments, the method further includes: receiving a second identifier from the first terminal device, where the second identifier is used to identify the first service; and sending the second identifier to the second AMF network element.

In some embodiments, the first terminal device may obtain the second identifier and send the second identifier to the first AMF network element, and the first AMF network element sends the second identifier to the second AMF network element, so that the second AMF network element determines the first service to be transferred from the second terminal device.

In some embodiments, the first service corresponds to a first application. Optionally, the second identifier identifies the first application, and the first service is identified by identifying the first application, where the first service is all services corresponding to the first application, that is, all services of the first application need to be transferred from the second terminal device to the first terminal device. Optionally, the first service identified by the second identifier is one service of the first application, that is, one service of the first application needs to be transferred from the second terminal device to the first terminal device.

In some embodiments, the method further includes:

receiving a third identifier from the first terminal device, where the third identifier is used to identify the second terminal device;

determining the second AMF network element based on the third identifier; and sending the third identifier to the second AMF network element.

In some embodiments, the first terminal device may obtain the third identifier of the second terminal device; the first terminal device sends the third identifier to the first AMF network element; and the first AMF network element may determine the second AMF network element based on the third identifier, and send the third identifier to the determined second AMF network element. This avoids a case in which the first AMF network element cannot determine an AMF network element to which the third identifier is to be sent.

In some embodiments, if the third identifier is a globally unique temporary identifier GUTI of the second terminal device, the determining the second AMF network element based on the third identifier includes:

determining the second AMF network element based on the GUTI of the second terminal device.

In some embodiments, if the third identifier is a mobile subscriber international ISDN number MSISDN of the second terminal device, the determining the second AMF network element based on the third identifier includes:

determining, from a unified data management UDM network element, the second AMF network element based on the MSISDN of the second terminal device, where the UDM network element corresponds to the first AMF network element and the second AMF network element.

According to a third aspect, a data transmission method is provided, where the method is applicable to a second user plane function UPF network element, the second UPF network element is a UPF network element serving a second terminal device, and the method includes:

receiving data of a first service; and sending the data of the first service to a first terminal device by using a second quality-of-service QoS flow of a first UPF network element, where the first UPF network element is a network element serving the first terminal device.

The second UPF network element and the second terminal device are configured to perform transmission of the data of the first service by using a first QoS flow, and the second QoS flow is determined based on information about the first QoS flow.

In some embodiments, after receiving the data of the first service, the second UPF network element may send the data of the first service to the first terminal device by using the second QoS flow of the first UPF network element. The second UPF network element and the second terminal device are configured to perform transmission of the data of the first service by using the first QoS flow. The second terminal device receives the data of the first service by using the first QoS flow, and the first terminal device may receive the data of the first service by using the second QoS flow that is obtained based on the information about the first QoS flow. In this way, the data of the first service may be transferred from the second terminal device to the first terminal device, to implement transfer of the data of the first service. In other words, the data of the first service is sent to the first UPF network element by using the second UPF network element; and then the first UPF network element sends, by using the second QoS flow between the first UPF network element and the first terminal device, the data of the first service to the first terminal device. This avoids a delay caused because the first terminal device needs to re-establish a connection to an application server and downloads the data of the first service when the data of the first service is transferred from the second terminal device to the first terminal device, and improves user experience.

Optionally, the receiving data of a first service includes: receiving the data of the first service from an application server corresponding to the first service.

Optionally, the method further includes: The second UPF network element receives first data of the first service, and sends the first data of the first service to the second terminal device by using the first QoS flow; and the second UPF network element receives second data of the first service, and sends the second data of the first service to the first terminal device by using the second QoS flow. Optionally, the first data and the second data may be the same or different.

In some embodiments, the method further includes: receiving a second internet protocol IP address that is of a second PDU session corresponding to the second QoS flow and that is sent by a second session management function SMF network element, where the second SMF network element is an SMF network element serving the second terminal device; and changing a destination address of the data of the first service to the second IP address of the second PDU session.

In some embodiments, the second UPF network element may receive the second IP address that is of the second PDU session corresponding to the second QoS flow and that is sent by the second SMF network element, and change the destination address of the received data of the first service to the second IP address of the second PDU session. In this way, when the data of the first service is sent to the first UPF network element, the first UPF network element may send the data of the first service to the first terminal device based on the second IP address.

Optionally, the second UPF network element receives first data of the first service, and sends the first data of the first service to the second terminal device by using the first QoS flow; and after the second UPF network element receives the second IP address of the second PDU session, if the second UPF network element receives second data of the first service, the second UPF network element sends the second data of the first service to the first terminal device by using the second QoS flow. In other words, after receiving the second IP address, the second UPF network element triggers switching of an object, to which the data of the first service is to be sent, from the second terminal device to the first UPF network element.

Optionally, if the first data is different from the second data, the second data is consecutive to the first data, to implement seamless transfer.

In some embodiments, the method further includes: receiving a third IP address of the first UPF network element that is sent by the second SMF network element; and determining to send the data of the first service to the first UPF network element based on the third IP address of the first UPF network element.

In some embodiments, the second UPF network element may receive the third IP address of the first UPF network element sent by the second SMF network element. In this way, when the data of the first service is sent to the second UPF network element, the first UPF network element may send the data of the first service to the first UPF network element based on the third IP address, so that the first UPF network element may send the data of the first service to the first terminal device by using the second QoS flow.

Optionally, the first UPF network element and the second UPF network element may be a same network element. Optionally, when the first UPF network element and the second UPF network element are a same network element, the second UPF network element may not receive the third IP address of the first UPF network element. In other words, in this case, the first UPF network element and the second UPF network element have are a same IP address.

According to a fourth aspect, a data transmission method is provided, where the method is applicable to a first user plane function UPF, the first UPF is a UPF network element serving a first terminal device, and the method includes:

obtaining data of a first service from a second UPF network element, where the second UPF network element is a network element serving a second terminal device; and sending the data of the first service to the first terminal device by using a second quality of service QoS flow of the first service, where the second QoS flow is determined based on information about a first QoS flow, and the first QoS flow is used by the second terminal device to receive the data of the first service.

In some embodiments, after obtaining the data of the first service from the second UPF network element, the first UPF network element may send the data of the first service to the first terminal device by using the second QoS flow, where the second QoS flow is determined based on the information about the first QoS flow; and the second terminal device receives the data of the first service by using the first QoS flow, and the first terminal device may receive the data of the first service by using the second QoS flow that is obtained based on the information about the first QoS flow. In this way, the data of the first service may be transferred from the second terminal device to the first terminal device, to implement transfer of the data of the first service. In other words, the data of the first service is sent to the first UPF network element by using the second UPF network element; and then the first UPF network element sends, by using the second QoS flow between the first UPF network element and the first terminal device, the data of the first service to the first terminal device. This avoids a delay caused because the first terminal device needs to re-establish a connection to an application server and downloads the data of the first service when the data of the first service is transferred from the second terminal device to the first terminal device, and improves user experience.

In some embodiments, the sending the data of the first service to the first terminal device by using a second QoS flow of the first service includes: sending, based on a second packet filter, the data of the first service to the first terminal device by using the second QoS flow, where the second packet filter includes a second internet protocol IP address of a second PDU session corresponding to the second QoS flow.

In some embodiments, the first UPF network element may send, based on the second IP address of the second PDU session in the second packet filter or in a third packet filter, the data of the first service to the first terminal device, thereby making it possible to send the data of the first service.

In some embodiments, the method further includes: receiving the second packet filter or a third packet filter sent by a first session management function SMF network element.

According to a fifth aspect, a data transmission method is provided, where the method is applicable to a second access and mobility management function AMF network element, the second AMF network element is a network element serving a second terminal device, and the method includes:

receiving a fifth identifier from the second terminal device, where the fifth identifier is used to identify a first QoS flow, and the first QoS flow is used by the second terminal device to receive data of a first service;

obtaining information about the first QoS flow based on the fifth identifier of the first QoS flow; and sending the information about the first QoS flow to a first AMF network element, where the information about the first QoS flow is used to determine a second QoS flow, the second QoS flow is used by a first terminal device to receive the data of the first service, and the first AMF network element is an AMF network element serving the first terminal device.

In some embodiments, the second AMF network element may obtain the information about the first QoS flow based on the fifth identifier, and send the information about the first QoS flow to the first AMF network element, where the information about the first QoS flow is used to establish the second QoS flow, the second QoS flow is used by the first terminal device to receive the data of the first service, and the first QoS flow is used by the second terminal device to receive the data of the first service. In this way, the data of the first service may be transferred from the second terminal device to the first terminal device, to implement transfer of the data of the first service. In other words, transfer of the data of the first service is implemented by using the second AMF network element. This avoids a delay caused because the first terminal device needs to re-establish a connection to an application server and downloads the data of the first service when the data of the first service is transferred from the second terminal device to the first terminal device, and improves user experience.

In some embodiments, the fifth identifier is further used to identify a first protocol data unit PDU session corresponding to the first QoS flow.

Optionally, the fifth identifier includes an identifier of the first QoS flow and an identifier of the first PDU session corresponding to the first QoS flow. In this way, the second AMF network element may send the identifier of the first QoS flow to a second SMF network element, and the second SMF network element obtains, based on the identifier of the first QoS flow, second description information and sends the second description information to the second AMF network element; and the second AMF network element may send the identifier of the first PDU session to the second SMF network element, and the second SMF network element obtains, based on the identifier of the first PDU session, first description information and sends the first description information to the second AMF network element.

In some embodiments, the information about the first QoS flow includes at least one of first description information of a first PDU session corresponding to the first QoS flow or second description information of the first QoS flow.

Optionally, the first description information includes at least one of a data network name DNN of the first PDU session, a session and service continuity SSC mode of the first PDU session, and single network slice selection assistance information S-NSSAI of the first PDU session.

Optionally, the second description information includes at least one of a quality of service identifier of the first QoS flow, a guaranteed bit rate of the first QoS flow, a guaranteed flow bit rate of the first QoS flow, a maximum flow bit rate of the first QoS flow, or an averaging window of the first QoS flow.

In some embodiments, the method further includes: receiving a first packet filter of the first service from the second terminal device, where the first packet filter includes a first internet protocol IP address of the first PDU session corresponding to the first QoS flow; and sending the first packet filter to the first AMF network element.

In some embodiments, the second AMF network element may receive the first packet filter from the second terminal device, and send the first packet filter to the first AMF network element, so that the first AMF network element sends the first packet filter to the first terminal device.

Optionally, the second AMF network element may receive, in one message, the fifth identifier and the first packet filter that are sent by the second terminal device; or certainly may receive, in different messages, the fifth identifier and the first packet filter. This is not limited in this embodiment of this application.

In some embodiments, the method further includes: receiving a second identifier from the second terminal device, where the second identifier is used to identify the first service; and sending the second identifier to the first AMF network element.

In some embodiments, the second AMF network element may receive the second identifier from the second terminal device, and send the second identifier to the first AMF network element, so that the first AMF network element sends the second identifier to the first terminal device, and the first terminal device may start in advance, a first application of the first service that is identified by the second identifier.

Optionally, the second AMF network element may receive, in one message, at least two of the fifth identifier, the second identifier, or the first packet filter that are sent by the second terminal device; or certainly, may receive, in different messages, at least two of the fifth identifier, the second identifier, or the first packet filter. This is not limited in this embodiment of this application.

In some embodiments, the method further includes: receiving a fourth identifier from the second terminal device, where the fourth identifier is used to identify the first terminal device; and determining the first AMF network element based on the fourth identifier.

In some embodiments, the second AMF network element may determine, based on the fourth identifier of the first terminal device, the first AMF network element corresponding to the first terminal device, to avoid a case in which the second AMF network element cannot determine the first AMF network element.

Optionally, the second AMF network element may receive, in one message, at least two of the fourth identifier, the fifth identifier, the second identifier, or the first packet filter that are sent by the second terminal device; or certainly, may receive, in different messages, at least two of the fourth identifier, the fifth identifier, the second identifier, or the first packet filter. This is not limited in this embodiment of this application.

In some embodiments, if the fourth identifier is a globally unique temporary identifier GUTI of the first terminal device, the determining the first AMF network element based on the fourth identifier includes: determining the first AMF network element based on the GUTI.

In some embodiments, if the fourth identifier is a mobile subscriber international ISDN number MSISDN of the first terminal device, the determining the first AMF network element based on the fourth identifier includes: determining, from a unified data management UDM network element, the first AMF network element based on the MSISDN of the first terminal device, where the UDM network element corresponds to the first AMF network element and the second AMF network element.

In some embodiments, the method further includes: receiving a second identifier sent by the first AMF network element, where the second identifier is used to identify the first service; and sending the second identifier to the second terminal device; and the receiving a fifth identifier from the second terminal device includes:

receiving the fifth identifier that is sent by the second terminal device based on the second identifier.

In some embodiments, a user may operate the first terminal device, to trigger the first terminal device to obtain the second identifier and send the second identifier to the first AMF network element. The first AMF network element sends the second identifier to the second AMF network element. The second AMF network element sends the second identifier to the second terminal device. The second terminal device determines, based on the second identifier, that the first service identified by the second identifier needs to be transferred. In this way, the second terminal device determines the first QoS flow corresponding to the first service and the first PDU session corresponding to the first QoS flow, to determine the fifth identifier.

In some embodiments, the method further includes: receiving a third identifier sent by the first AMF network element, where the third identifier is used to identify the second terminal device; and the sending the second identifier to the second terminal device includes: sending the second identifier to the second terminal device based on the third identifier.

In some embodiments, the user may operate the first terminal device, to trigger the first terminal device to obtain the third identifier and send the third identifier to the first AMF network element. The first AMF network element sends the third identifier to the second AMF network element. The second AMF network element determines, based on the third identifier, that a to-be-transferred device is the second terminal device, and therefore sends the second identifier to the second terminal device identified by the third identifier.

In some embodiments, the method further includes: receiving a second IP address of a second PDU session corresponding to the second QoS flow and/or a third IP address of a first UPF network element from the first AMF network element; and sending the second IP address of the second PDU session corresponding to the second QoS flow and/or the third IP address of the first UPF network element to the second SMF network element.

In some embodiments, after receiving the second IP address of the second PDU session and/or the third IP address of the first UPF network element from the first AMF network element, the second AMF network element sends the second IP address and/or the third IP address to the second SMF network element, so that the second SMF network element sends the second IP address and/or the third IP address to a second UPF network element. In this way, the second UPF network element may send the data of the first service to the first UPF network element based on the second IP address and/or the third IP address.

In some embodiments, the first service corresponds to a first application. Optionally, the second identifier identifies the first application, and the first service is identified by identifying the first application, where the first service is all services corresponding to the first application, that is, all services of the first application need to be transferred from the second terminal device to the first terminal device. Optionally, the first service identified by the second identifier is one service of the first application, that is, one service of the first application needs to be transferred from the second terminal device to the first terminal device.

According to a sixth aspect, a data transmission method is provided, where the method is applicable to a second terminal device, and the method includes: obtaining a fifth identifier, where the fifth identifier is used to identify a first QoS flow, and the first QoS flow is used by the second terminal device to receive data of a first service; and sending the fifth identifier to a second access and mobility management function AMF network element, where the second AMF network element is an AMF network element serving the second terminal device.

In some embodiments, the fifth identifier is further used to identify a first protocol data unit PDU session corresponding to the first QoS flow.

In some embodiments, the method further includes:

sending a first packet filter of the first service to the second AMF network element, where the first packet filter includes a first internet protocol IP address of a first PDU session corresponding to the first QoS flow.

In some embodiments, the method further includes:

obtaining, in response to a second operation instruction, a fourth identifier from a first terminal device, where the fourth identifier is used to identify the first terminal device; and sending the fourth identifier to the second AMF network element.

In some embodiments, the method further includes:

sending a second identifier to the second AMF network element, where the second identifier is used to identify the first service.

In some embodiments, the method further includes:

sending a third identifier and/or a second identifier to the first terminal device, where the third identifier is used to identify the second terminal device, and the second identifier is used to identify the first service.

In some embodiments, the method further includes:

receiving the second identifier sent by the second AMF network element; and the obtaining a fifth identifier includes:

obtaining the fifth identifier based on the second identifier.

In some embodiments, the first service corresponds to a first application. Optionally, the second identifier identifies the first application, and the first service is identified by identifying the first application, where the first service is all services corresponding to the first application, that is, all services of the first application need to be transferred from the second terminal device to the first terminal device. Optionally, the first service identified by the second identifier is one service of the first application, that is, one service of the first application needs to be transferred from the second terminal device to the first terminal device.

It needs to be noted that, for specific descriptions of the sixth aspect, refer to the descriptions of the first aspect to the fifth aspect. To avoid repetition, details are not described again.

According to a seventh aspect, a data transmission apparatus is provided. The apparatus is configured to perform the method in any possible implementation of the first aspect. Specifically, the apparatus may include a processing unit and a transceiver unit. The transceiver unit may communicate with an external device, and the processing unit is configured to process data. The transceiver unit may also be referred to as a communications interface or a communications unit.

The apparatus may be configured to perform actions performed by the first terminal device in any possible implementation of the first aspect, and in this case, the apparatus may be referred to as a first terminal device; the transceiver unit is configured to perform operations related to receiving and sending on the side of the first terminal device in any possible implementation of the first aspect; and the processing unit is configured to perform processing-related operations on the side of the first terminal device in any possible implementation of the first aspect.

The transceiver unit is configured to receive information about a first quality of service QoS flow from a first access and mobility management function AMF network element, where the first QoS flow is used by a second terminal device to receive data of a first service, and the first AMF network element is an AMF network element serving the apparatus; and the transceiver unit is further configured to receive the data of the first service by using a second QoS flow, where the second QoS flow is determined based on the information about the first QoS flow.

In some embodiments, the processing unit is configured to determine, based on the information about the first QoS flow, whether there is a PDU session and/or a QoS flow corresponding to the information about the first QoS flow; and the transceiver unit is further configured to send, based on whether there is a PDU session and/or a QoS flow corresponding to the information about the first QoS flow, a PDU session modification request message or a PDU session establishment request message to the first AMF network element.

In some embodiments, the information about the first QoS flow includes at least one of first description information of a first protocol data unit PDU session corresponding to the first QoS flow or second description information of the first QoS flow; and the first description information includes at least one of a data network name DNN of the first PDU session, a session and service continuity SSC mode of the first PDU session, and single network slice selection assistance information S-NSSAI of the first PDU session; and the second description information includes at least one of a quality-of-service identifier of the first QoS flow, a guaranteed bit rate of the first QoS flow, a guaranteed flow bit rate of the first QoS flow, a maximum flow bit rate of the first QoS flow, or an averaging window of the first QoS flow.

In some embodiments, the processing unit is specifically configured to:

if the information about the first QoS flow includes the first description information, determine, based on the first description information, whether there is a PDU session corresponding to the first description information; or if the information about the first QoS flow includes the second description information, determine, based on the second description information, whether there is a QoS flow corresponding to the second description information; or if the information about the first QoS flow includes the first description information and the second description information, determine, based on the first description information, whether there is a PDU session corresponding to the first description information, and determine, based on the second description information, whether there is a QoS flow corresponding to the second description information.

In some embodiments, the transceiver unit is specifically configured to:

if it is determined that there is a PDU session corresponding to the first description information but no QoS flow corresponding to the second description information, send the PDU session modification request message to the first AMF network element, where the PDU session modification request message includes the second description information, and the second description information is used to establish the second QoS flow; or if it is determined that there is no PDU session corresponding to the first description information, send the PDU session establishment request message to the first AMF network element, where the PDU session establishment request message includes the first description information, the first description information is used to establish a second PDU session corresponding to the second QoS flow; and send the PDU session modification request message to the first AMF network element, where the PDU session modification request message includes the second description information, and the second description information is used to establish the second QoS flow; or if it is determined that there is no PDU session corresponding to the first description information, send the PDU session establishment request message to the first AMF network element, where the PDU session establishment request message includes the first description information and the second description information, the first description information is used to establish a second PDU session corresponding to the second QoS flow, and the second description information is used to establish the second QoS flow; or if it is determined that there is a PDU session corresponding to the first description information and there is a QoS flow corresponding to the second description information, send the PDU session modification request message to the first AMF network element, where the PDU session modification request message is used to update a packet filter corresponding to the second QoS flow.

In some embodiments, the transceiver unit is further configured to receive a first packet filter of the first service sent by the first AMF network element, where the first packet filter includes a first internet protocol IP address of the first PDU session corresponding to the first QoS flow;

the processing unit is configured to change the first IP address of the first packet filter to a second IP address of a second PDU session corresponding to the second QoS flow, to obtain a second packet filter; and the transceiver unit is further configured to send the second packet filter to the first AMF network element.

In some embodiments, the second packet filter is carried in the PDU session modification request message.

In some embodiments, the transceiver unit is further configured to: receive a first identifier sent by the first AMF network element, where the first identifier is used to identify information related to the information about the first QoS flow; and if the apparatus sends the PDU session modification request message or the PDU session establishment request message to the first AMF network element, send the first identifier to the first AMF network element.

In some embodiments, the transceiver unit is further configured to: obtain a second identifier and/or a third identifier in response to a first operation instruction, where the second identifier is used to identify the first service, and the third identifier is used to identify the second terminal device; and send the third identifier and/or the second identifier to the first AMF network element.

In some embodiments, the transceiver unit is specifically configured to:

obtain the third identifier from the second terminal device; or obtain the third identifier from a management network element, where the management network element is configured to manage the apparatus and the second terminal device.

In some embodiments, the first service corresponds to a first application.

According to an eighth aspect, a data transmission apparatus is provided, where the apparatus is configured to perform the method in any possible implementation of the second aspect. Specifically, the apparatus may include a processing unit and a transceiver unit. The transceiver unit may communicate with an external device, and the processing unit is configured to process data. The transceiver unit may also be referred to as a communications interface or a communications unit.

The apparatus may be configured to perform actions performed by the first AMF network element in any possible implementation of the second aspect, and in this case, the apparatus may be referred to as a first AMF network element; the transceiver unit is configured to perform operations related to receiving and sending on the side of the first AMF network element in any possible implementation of the second aspect; and the processing unit is configured to perform processing-related operations on the side of the first AMF network element in any possible implementation of the second aspect.

The transceiver unit is configured to obtain information about a first quality of service QoS flow from a second AMF network element, where the first QoS flow is used by a second terminal device to receive data of a first service, and the second AMF network element is a network element serving the second terminal device; and the transceiver unit is further configured to send the information about the first QoS flow to a first terminal device, where the information about the first QoS flow is used to obtain a second QoS flow, and the second QoS flow is used by the first terminal device to receive the data of the first service.

In some embodiments, the transceiver unit is further configured to receive a PDU session modification request message or a PDU session establishment request message that is sent by the first terminal device based on the information about the first QoS flow.

In some embodiments, the information about the first QoS flow includes at least one of first description information of a first protocol data unit PDU session corresponding to the first QoS flow or second description information of the first QoS flow; and the first description information includes at least one of a data network name DNN of the first PDU session, a session and service continuity SSC mode of the first PDU session, and single network slice selection assistance information S-NSSAI of the first PDU session; and the second description information includes at least one of a quality-of-service identifier of the first QoS flow, a guaranteed bit rate of the first QoS flow, a guaranteed flow bit rate of the first QoS flow, a maximum flow bit rate of the first QoS flow, or an averaging window of the first QoS flow.

In some embodiments, the PDU session modification request message includes the second description information, and the second description information is used to establish the second QoS flow; or the PDU session modification request message is used to update a packet filter of the second QoS flow; or the PDU session establishment request message includes the first description information, the first description information is used to establish a second PDU session corresponding to the second QoS flow, the PDU session modification request message includes the second description information, and the second description information is used to establish the second QoS flow; or the PDU session establishment request message includes the first description information and the second description information, the first description information is used to establish a second PDU session corresponding to the second QoS flow, and the second description information is used to establish the second QoS flow.

In a possible implementation, the processing unit is further configured to:

send a first packet filter of the first service to the first terminal device, where the first packet filter includes a first internet protocol IP address of the first PDU session corresponding to the first QoS flow;

receive a second packet filter of the first terminal device, where the second packet filter includes a second IP address of the second PDU session; and send the second packet filter to a first session management function SMF network element, where the first SMF network element is an SMF network element serving the first terminal device.

In some embodiments, the second packet filter is carried in the PDU session modification request message.

In a possible implementation, the processing unit is further configured to:

obtain identification information of a second SMF network element of the second terminal device and/or identification information of a second user plane function UPF of the second terminal device from the second AMF network element, where the identification information of the second SMF network element is used to identify the second SMF network element, and the identification information of the second UPF is used to identify the second UPF;

send a first identifier to the first terminal device; and receive the first identifier from the first terminal device; and the processing unit is configured to: based on the received first identifier, determine the second SMF network element as the first SMF network element of the first terminal device, and/or determine the second UPF network element as a first UPF network element of the first terminal device.

In some embodiments, the transceiver unit is further configured to send the second IP address of the second PDU session corresponding to the second QoS flow and/or a third IP address of the first UPF network element of the first terminal device to the second AMF network element.

In some embodiments, the transceiver unit is further configured to: receive a second identifier from the second AMF network element, where the second identifier is used to identify the first service; and send the second identifier to the first terminal device.

In some embodiments, the transceiver unit is further configured to: receive a second identifier from the first terminal device, where the second identifier is used to identify the first service; and send the second identifier to the second AMF network element.

In some embodiments, the first service corresponds to a first application.

In some embodiments, the transceiver unit is further configured to receive a third identifier from the first terminal device, where the third identifier is used to identify the second terminal device;

the processing unit is further configured to determine the second AMF network element based on the third identifier; and the transceiver unit is further configured to send the third identifier to the second AMF network element.

In some embodiments, if the third identifier is a globally unique access and mobility management function identifier GUAMI of the second terminal device, the processing unit is specifically configured to determine the second AMF based on the GUAMI of the second terminal device.

In some embodiments, if the third identifier is a temporary mobile subscriber identity TMSI of the second terminal device, the processing unit is specifically configured to determine, from a unified data management UDM network element, the second AMF based on the TMSI of the second terminal device, where the UDM network element corresponds to the apparatus and the second AMF.

According to a ninth aspect, a data transmission apparatus is provided, where the apparatus is configured to perform the method in any possible implementation of the third aspect. Specifically, the apparatus may include a processing unit and a transceiver unit. The transceiver unit may communicate with an external device, and the processing unit is configured to process data. The transceiver unit may also be referred to as a communications interface or a communications unit.

The apparatus may be configured to perform actions performed by the second UPF network element in any possible implementation of the third aspect, and in this case, the apparatus may be referred to as the second UPF network element; the transceiver unit is configured to perform operations related to receiving and sending on the side of the second UPF network element in any possible implementation of the third aspect; and the processing unit is configured to perform processing-related operations on the side of the second UPF network element in any possible implementation of the third aspect.

The transceiver unit is configured to: receive data of a first service; and send the data of the first service to a first terminal device by using a second quality of service QoS flow of a first UPF network element, where the first UPF network element is a network element serving the first terminal device. The apparatus and the second terminal device are configured to perform transmission of the data of the first service by using the first QoS flow, and the second QoS flow is determined based on information about the first QoS flow.

In a possible implementation, the processing unit is further configured to:

receive a second internet protocol IP address that is of a second PDU session corresponding to the second QoS flow and that is sent by a second session management function SMF network element, where the second SMF network element is an SMF network element serving the second terminal device; and the processing unit is configured to change a destination address of the data of the first service to the second IP address of the second PDU session.

In some embodiments, the transceiver unit is further configured to: receive a third IP address of the first UPF network element that is sent by the second SMF network element of the second terminal device; and determine to send the data of the first service to the first UPF network element based on the third IP address of the first UPF network element.

According to a tenth aspect, a data transmission apparatus is provided, where the apparatus is configured to perform the method in any possible implementation of the fourth aspect. Specifically, the apparatus may include a processing unit and a transceiver unit. The transceiver unit may communicate with an external device, and the processing unit is configured to process data. The transceiver unit may also be referred to as a communications interface or a communications unit.

The apparatus may be configured to perform actions performed by the first UPF network element in any possible implementation of the fourth aspect, and in this case, the apparatus may be referred to as the first UPF network element; the transceiver unit is configured to perform operations related to receiving and sending on the side of the first UPF network element in any possible implementation of the fourth aspect; and the processing unit is configured to perform processing-related operations on the side of the first UPF network element in any possible implementation of the fourth aspect.

The transceiver unit is configured to obtain data of a first service from a second UPF network element, where the second UPF network element is a network element serving a second terminal device; and the transceiver unit is further configured to send the data of the first service to a first terminal device by using a second quality of service QoS flow of the first service, where the second QoS flow is determined based on the information about a first QoS flow, and the first QoS flow is used by the second terminal device to receive the data of the first service.

In some embodiments, the transceiver unit is specifically configured to send, based on a second packet filter, the data of the first service to the first terminal device by using the second QoS flow, where the second packet filter includes a second internet protocol IP address of a second PDU session corresponding to the second QoS flow, and a first packet filter stored in the second UPF includes a first IP address of a first PDU session corresponding to the first QoS flow.

In some embodiments, if a third packet filter is received, the transceiver unit is specifically configured to send, based on the third packet filter, the data of the first service to the first terminal device by using the second QoS flow, where the third packet filter includes a second internet protocol IP address of a second PDU session corresponding to the second QoS flow, and the third packet filter is obtained based on the second packet filter.

In some embodiments, the transceiver unit is further configured to receive the second packet filter or the third packet filter sent by a first session management function SMF network element.

According to an eleventh aspect, a data transmission apparatus is provided, where the apparatus is configured to perform the method in any possible implementation of the fifth aspect. Specifically, the apparatus may include a processing unit and a transceiver unit. The transceiver unit may communicate with an external device, and the processing unit is configured to process data. The transceiver unit may also be referred to as a communications interface or a communications unit.

The apparatus may be configured to perform actions performed by the second AMFSMF network element in any possible implementation of the fifth aspect, and in this case, the apparatus may be referred to as a second AMF network element; the transceiver unit is configured to perform operations related to receiving and sending on the side of the second AMF network element in any possible implementation of the fifth aspect; and the processing unit is configured to perform processing-related operations on the side of the second AMF network element in any possible implementation of the fifth aspect.

The transceiver unit is configured to receive a fifth identifier from a second terminal device, where the fifth identifier is used to identify a first QoS flow, and the first QoS flow is used by the second terminal device to receive data of a first service;

the transceiver unit is further configured to obtain information about the first QoS flow based on the fifth identifier of the first QoS flow; and the transceiver unit is further configured to send the information about the first QoS flow to a first AMF network element, where the information about the first QoS flow is used to determine a second QoS flow, the second QoS flow is used by a first terminal device to receive the data of the first service, and the first AMF network element is an AMF network element serving the first terminal device.

In some embodiments, the fifth identifier is further used to identify a first protocol data unit PDU session corresponding to the first QoS flow.

In some embodiments, the information about the first QoS flow includes at least one of first description information of a first PDU session corresponding to the first QoS flow or second description information of the first QoS flow; the first description information includes at least one of a data network name DNN of the first PDU session, a session and service continuity SSC mode of the first PDU session, and single network slice selection assistance information S-NS- SAI of the first PDU session; and the second description information includes at least one of a quality of service identifier of the first QoS flow, a guaranteed bit rate of the first QoS flow, a guaranteed flow bit rate of the first QoS flow, a maximum flow bit rate of the first QoS flow, or an averaging window of the first QoS flow.

In some embodiments, the transceiver unit is further configured to: receive a first packet filter of the first service from the second terminal device, where the first packet filter includes a first internet protocol IP address of the first PDU session corresponding to the first QoS flow; and send the first packet filter to the first AMF network element.

In some embodiments, the transceiver unit is further configured to: receive a second identifier from the second terminal device, where the second identifier is used to identify the first service; and send the second identifier to the first AMF network element.

In some embodiments, the transceiver unit is further configured to receive a fourth identifier from the second terminal device, where the fourth identifier is used to identify the first terminal device; and the processing unit is configured to determine the first AMF network element based on the fourth identifier.

In some embodiments, if the fourth identifier is a globally unique temporary identifier GUTI of the first terminal device, the processing unit is specifically configured to determine the first AMF network element based on the GUTI.

In some embodiments, if the fourth identifier is a mobile subscriber international ISDN number MSISDN of the first terminal device, the processing unit is specifically configured to determine, from a unified data management UDM network element, the first AMF network element based on the MSISDN of the first terminal device, where the UDM network element corresponds to the first AMF network element and the apparatus.

In some embodiments, the transceiver unit is further configured to: receive a second identifier sent by the first AMF network element, where the second identifier is used to identify the first service; and send the second identifier to the second terminal device; and the transceiver unit is specifically configured to receive the fifth identifier sent based on the second identifier by the second terminal device.

In some embodiments, the transceiver unit is further configured to receive a third identifier sent by the first AMF network element, where the third identifier is used to identify the second terminal device; and the transceiver unit is specifically configured to send the second identifier to the second terminal device based on the third identifier.

In some embodiments, the transceiver unit is further configured to receive a second IP address of a second PDU session corresponding to the second QoS flow and/or a third IP address of a first UPF network element from the first AMF network element; and send the second IP address of the second PDU session corresponding to the second QoS flow and/or the third IP address of the first UPF network element to the second SMF network element.

In some embodiments, the first service corresponds to a first application.

According to a twelfth aspect, a data transmission apparatus is provided, where the apparatus is configured to perform the method in any possible implementation of the sixth aspect. Specifically, the apparatus may include a processing unit and a transceiver unit. The transceiver unit may communicate with an external device, and the processing unit is configured to process data. The transceiver unit may also be referred to as a communications interface or a communications unit.

The apparatus may be configured to perform actions performed by the second terminal device in any possible implementation of the sixth aspect, and in this case, the apparatus may be referred to as a second terminal device; the transceiver unit is configured to perform operations related to receiving and sending on the side of the second terminal device in any possible implementation of the sixth aspect; and the processing unit is configured to perform processing-related operations on the side of the second terminal device in any possible implementation of the sixth aspect.

The transceiver unit is configured to obtain a fifth identifier, where the fifth identifier is used to identify a first QoS flow, and the first QoS flow is used by the apparatus to receive data of a first service; and the transceiver unit is further configured to send the fifth identifier to a second access and mobility management function AMF network element, where the second AMF network element is an AMF network element serving the apparatus.

In some embodiments, the fifth identifier is further used to identify a first protocol data unit PDU session corresponding to the first QoS flow.

In some embodiments, the transceiver unit is further configured to send a first packet filter of the first service to the second AMF network element, where the first packet filter includes a first internet protocol IP address of a first PDU session corresponding to the first QoS flow.

In some embodiments, the transceiver unit is further configured to: obtain, in response to a second operation instruction, a fourth identifier from a first terminal device, where the fourth identifier is used to identify the first terminal device; and send the fourth identifier to the second AMF network element.

In some embodiments, the transceiver unit is further configured to send a second identifier to the second AMF network element, where the second identifier is used to identify the first service.

In some embodiments, the transceiver unit is further configured to send a third identifier and/or a second identifier to the first terminal device, where the third identifier is used to identify the apparatus, and the second identifier is used to identify the first service.

In some embodiments, the transceiver unit is further configured to receive the second identifier sent by the second AMF network element; and the transceiver unit is specifically configured to obtain the fifth identifier based on the second identifier.

In some embodiments, the first service corresponds to a first application.

According to a thirteenth aspect, a communications apparatus is provided. The communications apparatus includes a processor and a memory. The processor is coupled to the memory, the memory is configured to store a computer program or instructions, and the processor is configured to execute the computer program or the instructions stored in the memory, so that the method according to the first aspect or any possible implementation of the first aspect is performed.

For example, the processor is configured to execute the computer program or the instructions stored in the memory, so that the communications apparatus performs the method according to the first aspect or any possible implementation of the first aspect.

Optionally, the apparatus includes one or more processors.

Optionally, the communications apparatus may alternatively include a memory coupled to the processor.

Optionally, the communications apparatus may include one or more memories.

Optionally, the memory may be integrated with the processor, or the memory and the processor are disposed separately.

Optionally, the communications apparatus may further include a transceiver.

According to a fourteenth aspect, a communications apparatus is provided. The communications apparatus includes a processor and a memory. The processor is coupled to the memory, the memory is configured to store a computer program or instructions, and the processor is configured to execute the computer program or the instructions stored in the memory, so that the method according to the second aspect or any possible implementation of the second aspect is performed.

For example, the processor is configured to execute the computer program or the instructions stored in the memory, so that the communications apparatus performs the method according to the second aspect or any possible implementation of the second aspect.

Optionally, the apparatus includes one or more processors.

Optionally, the communications apparatus may alternatively include a memory coupled to the processor.

Optionally, the communications apparatus may include one or more memories.

Optionally, the memory may be integrated with the processor, or the memory and the processor are disposed separately.

Optionally, the communications apparatus may further include a transceiver.

According to a fifteenth aspect, a communications apparatus is provided. The communications apparatus includes a processor and a memory. The processor is coupled to the memory, the memory is configured to store a computer program or instructions, and the processor is configured to execute the computer program or the instructions stored in the memory, so that the method according to the third aspect or any possible implementation of the third aspect is performed.

For example, the processor is configured to execute the computer program or the instructions stored in the memory, so that the communications apparatus performs the method according to the third aspect or any possible implementation of the third aspect.

Optionally, the apparatus includes one or more processors.

Optionally, the communications apparatus may alternatively include a memory coupled to the processor.

Optionally, the communications apparatus may include one or more memories.

Optionally, the memory may be integrated with the processor, or the memory and the processor are disposed separately.

Optionally, the communications apparatus may further include a transceiver.

According to a sixteenth aspect, a communications apparatus is provided. The communications apparatus includes a processor and a memory. The processor is coupled to the memory, the memory is configured to store a computer program or instructions, and the processor is configured to execute the computer program or the instructions stored in the memory, so that the method according to the fourth aspect or any possible implementation of the fourth aspect is performed.

For example, the processor is configured to execute the computer program or the instructions stored in the memory, so that the communications apparatus performs the method according to the fourth aspect or any possible implementation of the fourth aspect.

Optionally, the apparatus includes one or more processors.

Optionally, the communications apparatus may alternatively include a memory coupled to the processor.

Optionally, the communications apparatus may include one or more memories.

Optionally, the memory may be integrated with the processor, or the memory and the processor are disposed separately.

Optionally, the communications apparatus may further include a transceiver.

According to a seventeenth aspect, a communications apparatus is provided. The communications apparatus includes a processor and a memory. The processor is coupled to the memory, the memory is configured to store a computer program or instructions, and the processor is configured to execute the computer program or the instructions stored in the memory, so that the method according to the fifth aspect or any possible implementation of the fifth aspect is performed.

For example, the processor is configured to execute the computer program or the instructions stored in the memory, so that the communications apparatus performs the method according to the fifth aspect or any possible implementation of the fifth aspect.

Optionally, the apparatus includes one or more processors.

Optionally, the communications apparatus may alternatively include a memory coupled to the processor.

Optionally, the communications apparatus may include one or more memories.

Optionally, the memory may be integrated with the processor, or the memory and the processor are disposed separately.

Optionally, the communications apparatus may further include a transceiver.

According to an eighteenth aspect, a communications apparatus is provided. The communications apparatus includes a processor and a memory. The processor is coupled to the memory, the memory is configured to store a computer program or instructions, and the processor is configured to execute the computer program or the instructions stored in the memory, so that the method according to the sixth aspect or any possible implementation of the sixth aspect is performed.

For example, the processor is configured to execute the computer program or the instructions stored in the memory, so that the communications apparatus performs the method according to the sixth aspect or any possible implementation of the sixth aspect.

Optionally, the apparatus includes one or more processors.

Optionally, the communications apparatus may alternatively include a memory coupled to the processor.

Optionally, the communications apparatus may include one or more memories.

Optionally, the memory may be integrated with the processor, or the memory and the processor are disposed separately.

Optionally, the communications apparatus may further include a transceiver.

According to a nineteenth aspect, a communications system is provided, where the communications system includes the apparatuses according to at least two of the seventh aspect or any possible implementation of the seventh aspect to the twelfth aspect or any possible implementation of the twelfth aspect; or the communications system includes the apparatuses according to at least two of the thirteenth aspect or any possible implementation of the thirteenth aspect to the eighteenth aspect or any possible implementation of the eighteenth aspect.

According to a twentieth aspect, a computer-readable storage medium is provided, and the computer-readable storage medium stores a computer program (which may also be referred to as instructions or code) configured to implement the method according to each of the foregoing aspects or any possible implementation of the foregoing aspects.

For example, when the computer program is executed by a computer, the computer is enabled to perform the method according to each of the foregoing aspects or any possible implementation of the foregoing aspects. The computer may be a communications apparatus.

According to a twenty-first aspect, this application provides a chip, which includes a processor. The processor is configured to read and execute a computer program stored in a memory, to perform the method according to ach of the foregoing aspects or any possible implementations of the foregoing aspects.

Optionally, the chip further includes a memory, and the memory and the processor are connected by a circuit or a wire.

Optionally, the chip further includes a communications interface.

According to a twenty-second aspect, this application provides a computer program product, where the computer program product includes a computer program (which may also be referred to as instructions or code), and when the computer program is executed by a computer, the computer is enabled to implement the method according to each of the foregoing aspects or any possible implementation of the foregoing aspects.

BRIEF DESCRIPTION OF DRAWINGS

FIG. 2A and FIG. 2B to FIG. 6A and FIG. 6B each is a schematic diagram of a data transmission method according to an embodiment of this application.

DETAILED DESCRIPTION

The following describes the technical solutions in embodiments of this application with reference to the accompanying drawings in embodiments of this application.

The technical solutions in embodiments of this application may be applied to various communication systems, for example, a global system for mobile communications (GSM) system, a code division multiple access (CDMA) system, a wideband code division multiple access (WCDMA) system, a general packet radio service (general packet radio service, GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a future fifth Generation (5G) system, or a new radio (NR) system.

Figure 1:
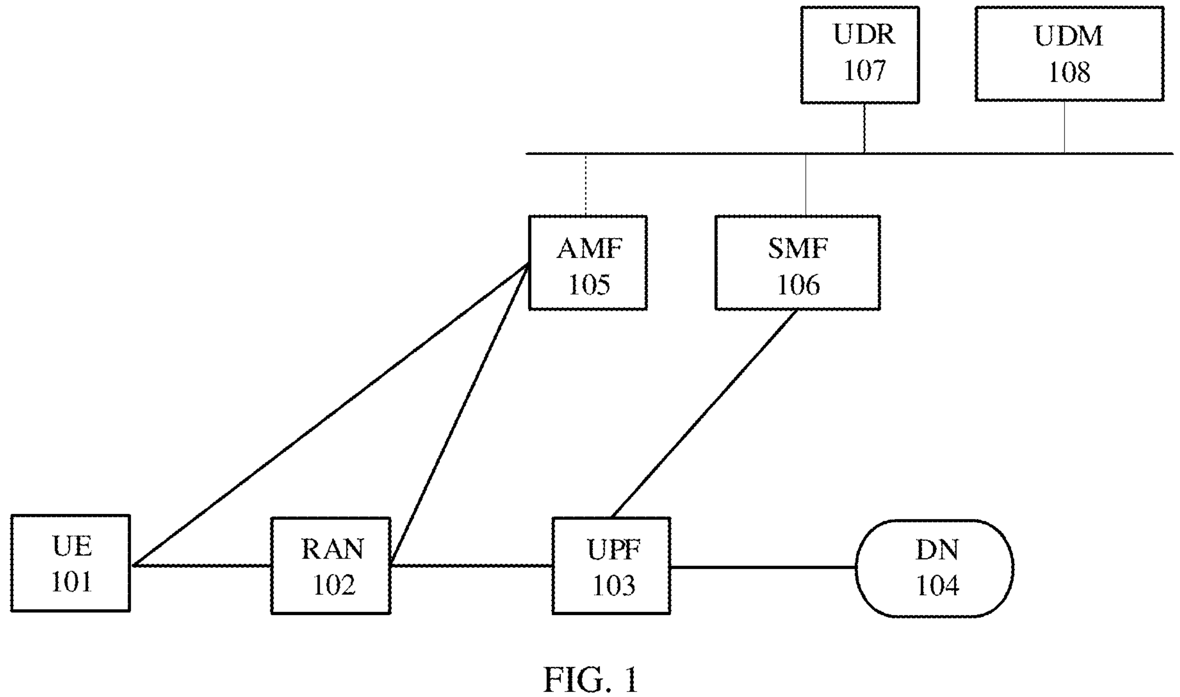
FIG. 1 is a schematic diagram of an architecture of a system according to an embodiment of this application.

FIG. 1 is a schematic diagram of an architecture of a system for use in an embodiment of this application. As shown in FIG. 1, the system 100 includes at least one of user equipment (UE) 101, a radio access network (RAN) 102, a user plane function (UPF) 103, a data network (DN) 104, a core network access and mobility management function (AMF) 105, a session management function (SMF) 106, a unified data repository (UDR) 107, or a unified data management (UDM) 108.

The UE 101 may also be referred to as a terminal device, a mobile station (MS), a mobile terminal (MT), an access terminal, a subscriber unit, a subscriber station, a mobile station, a mobile console, a remote station, a remote terminal, a mobile device, a user terminal, a terminal, a wireless communications device, a user agent, a user apparatus, or the like.

The UE 101 may be a device that provides voice/data connectivity for a user, for example, a handheld device or a vehicle-mounted device that has a wireless connection function. Currently, examples of a terminal device include: a mobile phone, a tablet computer, a laptop computer, a pocket PC, a mobile internet device (MID), a wearable device, a virtual reality (VR) device, an augmented reality (AR) device, a wireless terminal in industrial control (industrial control), a wireless terminal in self-driving, a wireless terminal in remote medical surgery (remote medical surgery), a wireless terminal in a smart grid, a wireless terminal in transportation safety, a wireless terminal in a smart city, a wireless terminal in smart home, a cellular phone, a cordless telephone set, a session initiation protocol (SIP) phone, a wireless local loop (WLL) station, a personal digital assistant (PDA), a handheld device having a wireless communications function, a computing device or another processing device connected to a wireless modem, a vehicle-mounted device, a wearable device, a terminal device in a 5G network, a terminal device in a future evolved public land mobile network (PLMN), or the like. This is not limited in this application. Alternatively, the UE 101 is a communications chip in such a terminal device.

The RAN 102 may be a device communicating with the UE 101. The RAN 102 may also be referred to as an access network device or a radio access network device. The RAN 102 may be a transmission reception point (TRP), or may be an evolved NodeB (eNB, or eNodeB) in an LTE system, or may be a home NodeB (for example, a home evolved NodeB, or a home NodeB, HNB), a baseband unit (BBU), or a radio controller in a cloud radio access network (CRAN) scenario. Alternatively, the RAN 102 may be a relay station, an access point, a vehicle-mounted device, a wearable device, a network device in a 5G network, a network device in a future evolved PLMN network, or the like; or may be an access point (AP) in a WLAN, or may be a gNB in an NR system; or the RAN 102 may be a city base station, a micro base station, a pico base station, a femto base station, or the like. This is not limited in this application.

In a network structure, the RAN 102 may include a central unit (CU) node, or a distributed unit (DU) node; or a radio access network (RAN) device including: a CU node and a DU node; or a device including: a control plane CU node (CU-CP node), a user plane CU node (CU-UP node), and a DU node.

The RAN 102 serves a cell. The UE 101 communicates with the cell by using a transmission resource (for example, a frequency domain resource or a spectrum resource) allocated by the RAN 102. The cell may belong to a macro base station (for example, a macro eNB or a macro gNB), or may belong to a base station corresponding to a small cell. The small cell herein may include: a metro cell, a micro cell, a pico cell, a femto cell, and the like. These small cells are characterized by small coverage and low transmit power, and are suitable for providing a high-rate data transmission service.

The UPF 103 is mainly responsible for processing service data, for example, forwarding, billing, and lawful interception.

The DN 104 provides a data transmission service for the UE 101, and may be a public data network PDN), for example, the internet.

The AMF 105 is mainly used for attachment, mobility management, and a tracking area update procedure of the UE 101 in a mobile network. The AMF network element terminates a non-access stratum (NAS) message; performs registration management, connection management, reachability management, tracking area list (TA list) allocation, mobility management, and the like; and transparently routes a session management (SM) message to the SMF network element.

The SMF 106 is responsible for: UPF selection or reselection; IP address allocation; session establishment, modification, and release; and quality of service (QoS) control.

The UDR 107 is responsible for storing structured data information, where the data information includes subscription information, policy information, and network data or service data defined in a standard format, for example, an upgrade package.

The UDM 108 is responsible for managing subscription information about the UE 101.

It needs to be noted that, names of the network elements (for example, the UE 101, the RAN 102, the UPF 103, the DN 104, the AMF 105, the SMF 106, the UDR 107, and the UDM 108) included in FIG. 1 are merely names, and the names do not constitute a limitation on functions of the network elements. In a 5G network or another future network, the foregoing network elements may alternatively have other names. This is not specifically limited in embodiments of this application. For example, in a 6G network, some or all of the foregoing network elements may still use terms in 5G, or may have other names. Details are not described again below.

It needs to be noted that the network elements in FIG. 1 do not necessarily exist simultaneously, and required network elements may be determined based on a requirement. A connection relationship between the network elements in FIG. 1 is not uniquely determined, and may be adjusted based on a requirement.

It also needs to be noted that, in FIG. 1, other network elements than the UE 101 may be referred to as network devices. In other words, the network devices may include one or more network elements other than the UE 101 in FIG. 1.

For ease of description, the numbers of the network elements are omitted below. For example, the "UE" represents the "UE 101", and the "AMF" represents the "AMF 105".

In an embodiment, data may be transmitted between one or more UEs in FIG. 1 by using a direct communications path, and the one or more UEs may belong to UEs of a same user, or may belong to UEs of different users. For example, the direct communications path may be Bluetooth, Wi-Fi, sidelink, ultra-wideband (UWB), or ultrasonic communications, where Wi-Fi may include Wi-Fi direct. However, in some scenarios, when data is transmitted between two UEs by using a direct communications path, the two UEs need to participate in an entire process and cannot exit, causing poor user experience. For example, in a projection scenario, a mobile phone may project, by using a direct communications path, media on the mobile phone onto a television for display. In a projection process, the mobile phone also keeps playing the media. If the mobile phone exits from the playing, the mobile phone cannot perform projection on the television. Consequently, power consumption of the mobile phone is relatively high. For example, if the media is a movie lasting two and a half hours, when the television plays the movie lasting two and a half hours, the mobile phone also needs to play the movie for two and a half hours. In this case, if the mobile phone is in a state of playing the movie for a long time, power consumption of the mobile phone is relatively high, that is, a substantial amount of power of the mobile phone is consumed. If the power of the mobile phone is insufficient, the mobile phone is powered off and then the mobile phone cannot continue to play the movie, resulting in poor user experience; or, the mobile phone keeps playing the media, and probably another service of the mobile phone cannot be initiated for this reason, for example, when the mobile phone is projecting the played movie onto the television, if a video call needs to be initiated, the video call cannot be initiated or the movie cannot continue to be projected, causing poor user experience.

In another embodiment, one or more UEs in FIG. 1 may alternatively complete data transfer by interacting with an application server. UE 1 establishes a connection to the application server, and the UE 1 downloads data. When a user needs to transfer data from the UE 1 to UE 2, the user may use the UE 2 to download the data. The UE 2 then establishes a connection to the application server, and the UE 1 is disconnected from the application server. In this way, a data delay occurs. In other words, in a process in which the UE 2 establishes the connection to the application server, the UE 1 is already disconnected from the application server, and in a process in which the UE 2 establishes the connection to the application server and downloads the data, the data is in an interrupted state, causing poor user experience. For example, the UE 1 establishes a connection to the application server, and downloads a movie by using the application server, so that the user may watch the movie played by the UE 1; and when the user needs to continue to watch the movie on the UE 2, the UE 2 establishes a connection to the application server, and downloads the movie by using the application server, so that the user may continue to watch the movie, where the UE 1 may be disconnected from the application server. The UE 1 and the UE 2 may be a same user account. After the user logs in to the UE 2, the UE 2 may save a playing position of the user on the UE 1, and the UE 2 may continue to play the movie according to the playing position of the UE 1, so as to complete continuous playing. However, when the UE 2 establishes a connection to the application server and then downloads data of the movie, data interruption is caused, that is, in a process in which the UE 2 establishes the connection to the application server, the user cannot continue to watch the movie, causing poor user experience. For another example, the UE 1 is performing a voice call; and to transfer the ongoing voice call of the UE 1 to the UE 2, the UE 1 needs to disconnect from the application server, and then the UE 2 establishes a connection to the application server, causing interruption of the voice call and poor user experience.

In view of the foregoing problem, an embodiment of this application provides the following data transmission method: A first terminal device may perform transmission of data of a first service by using a second quality of service (QoS) flow, where the second QoS flow is obtained based on information about a first QoS flow, and the first QoS flow is used by a second terminal device to receive the data of the first service, that is, the second terminal device receives the data of the first service by using the first QoS flow. In this way, the first terminal device can receive the data of the first service by using the second QoS flow that is obtained based on the information about the first QoS flow, so that the data of the first service may be transferred from the second terminal device to the first terminal device, to implement transfer of the data of the first service. In other words, the information about the first QoS flow may be sent to the first terminal device by using a core network element (for example, a first AMF network element), to implement transfer of the data of the first service. This avoids a delay caused because the first terminal device needs to re-establish a connection to an application server and downloads the data of the first service when the data of the first service is transferred from the second terminal device to the first terminal device, and improves user experience.

For example, in a projection scenario, the second terminal device is a mobile phone, and the first terminal device is a television; and for a ball game played on the way by using the mobile phone, after going home, the user wants to project the ball game played on the mobile phone onto the television. When the user was on the way, the mobile phone downloaded, by using a first QoS flow between the mobile phone and a core network element of the mobile phone, data from an application server of the game, and played the data on the mobile phone. After the user returns home, the user may perform an operation on the mobile phone to trigger a projection function. After the television obtains information about the first QoS flow, the television may establish, based on the information about the first QoS flow, a second QoS flow with a core network element of the television. In a process of establishing the second QoS flow, the mobile phone may still download the data by using the first QoS flow between the mobile phone and the core network element of the mobile phone; after the second QoS flow is established, the data corresponding to the ball game is first sent, based on an original path, from the application server of the ball game to the core network element of the mobile phone; the core network element of the mobile phone may forward the data corresponding to the ball game to the core network element of the television, so that the core network element of the television forwards the data corresponding to the television, to implement the projection function; and after the second QoS flow is established, the mobile phone may exit, and the television does not need to directly download the data from the application server of the ball game. This helps reduce a transmission delay and avoids frame freezing in a projection process, thereby improving user experience.

The following provides specific descriptions with reference to embodiments. However, it needs to be understood that, the foregoing described projection function is merely a possible application scenario, and embodiments of this application are also applicable to another scenario, for example, a WeChat call scenario.

It may be understood that, a first UPF network element, a first AMF network element, and a first SMF network element mentioned in the following embodiments are network elements corresponding to the first terminal device, that is, network elements serving the first terminal device; and a second UPF network element, a second AMF network element, and a second SMF network element are network elements corresponding to the second terminal device, that is, network elements serving the second terminal device. The first SMF network element and the second SMF network element may be a same entity or different entities, and this is not limited in embodiments of this application. The first AMF network element and the second AMF network element may be a same entity or different entities, and this is not limited in embodiments of this application. The first UPF network element and the second UPF network element may be a same entity or different entities, and this is not limited in this embodiment of this application.

The following describes, with reference to the accompanying drawings, a data transmission method 200 provided in an embodiment of this application. The method 200 includes the following steps.

S201: A second UPF network element sends data of a first service to a second terminal device by using a first QoS flow, and the second terminal device receives, by using the first QoS flow, the data of the first service sent by the second UPF network element.

The second UPF network element may be a network element serving the second terminal device, or the second UPF network element may be a UPF network element of the second terminal device.

Optionally, the first QoS flow is a QoS flow in a first protocol data unit (PDU) session, that is, a PDU session corresponding to the first QoS flow is the first PDU session, in other words, the first QoS flow belongs to the first PDU session. The second terminal device and the second UPF network element perform transmission of the data of the first service by using the first QoS flow corresponding to the first PDU session.

Optionally, the first QoS flow may be specifically divided into two segments: a first segment is a user plane connection between the second UPF network element and a base station of the second terminal device, that is, an N3 connection; and a second segment is a user plane connection between the base station of the second terminal device and the second terminal device, that is, a data radio bearer (DRB).

Optionally, the first service may be a service (for example, a video service, a voice service, a chat service, an internet access service, or an online shopping service) of an application (APP) on the second terminal device, or all services of an APP on the second terminal device. Alternatively, the first service may be any service of the second terminal device, or may be a service related to or unrelated to an APP. Alternatively, the first service may be all services on the second terminal device. This is not limited in this embodiment of this application.

Optionally, the second UPF network element receives the data of the first service from an application server corresponding to the first service, and then performs S201.

S202: The second terminal device obtains a fourth identifier of a first terminal device, where the fourth identifier is used to identify the first terminal device.

In S202, the second terminal device may obtain the fourth identifier in any one of the following manners.

Manner 1: The second terminal device obtains the fourth identifier from the first terminal device.

Optionally, that the second terminal device obtains the fourth identifier from the first terminal device includes: The second terminal device may send an identifier request message to the first terminal device, where the identifier request message is used to request an identifier of the first terminal device from the first terminal device; and the second terminal device receives the fourth identifier sent by the first terminal device.

Optionally, that the second terminal device may send an identifier request message to the first terminal device includes: The second terminal device sends the identifier request message to the first terminal device by using Bluetooth; and that the second terminal device receives the fourth identifier sent by the first terminal device includes: The second terminal device receives, by using Bluetooth, the fourth identifier sent by the first terminal device.

Optionally, that the second terminal device may send an identifier request message to the first terminal device includes: The second terminal device sends the identifier request message to the first terminal device by using Wi-Fi; and that the second terminal device receives the fourth identifier sent by the first terminal device includes: The second terminal device receives, by using Wi-Fi, the fourth identifier sent by the first terminal device.

Optionally, that the second terminal device may send an identifier request message to the first terminal device includes: The second terminal device sends the identifier request message to the first terminal device by using sidelink; and that the second terminal device receives the fourth identifier sent by the first terminal device includes: The second terminal device receives, by using sidelink, the fourth identifier sent by the first terminal device.

Optionally, that the second terminal device may send an identifier request message to the first terminal device includes: The second terminal device sends the identifier request message to the first terminal device by using UWB; and that the second terminal device receives the fourth identifier sent by the first terminal device includes: The second terminal device receives, by using UWB, the fourth identifier sent by the first terminal device.

Optionally, that the second terminal device may send an identifier request message to the first terminal device includes: The second terminal device sends the identifier request message to the first terminal device by using ultrasonic communications; and that the second terminal device receives the fourth identifier sent by the first terminal device includes: The second terminal device receives, by using ultrasonic communications, the fourth identifier sent by the first terminal device.

Optionally, that the second terminal device may send an identifier request message to the first terminal device includes: The second terminal device sends the identifier request message to the first terminal device by using a specific communications system (for example, a 5G communications system or a 4G communications system); and that the second terminal device receives the fourth identifier sent by the first terminal device includes: The second terminal device receives, by using the specific communications system, the fourth identifier sent by the first terminal device.

Manner 2: The second terminal device obtains the fourth identifier from a management network element, where the management network element is configured to manage the first terminal device and the second terminal device, and the management network element may store the fourth identifier of the first terminal device and a third identifier of the second terminal device.

Optionally, the management network element may be a device management center, for example, a device management server at home or in a company; or the management network element may be an application (APP) server, where the server is deployed in the internet.

Optionally, that the second terminal device obtains the fourth identifier from a management network element includes: The second terminal device may send an identifier request message to the management network element, where the identifier request message is used to request an identifier of the first terminal device from the management network element; and the second terminal device receives the fourth identifier sent by the management network element.

Optionally, that the second terminal device may send an identifier request message to the management network element includes: The second terminal device sends the identifier request message to the management network element by using Bluetooth; and that the second terminal device receives the fourth identifier sent by the management network element includes: The second terminal device receives, by using Bluetooth, the fourth identifier sent by the management network element.

Optionally, that the second terminal device may send an identifier request message to the management network element includes: The second terminal device sends the identifier request message to the management network element by using Wi-Fi; and that the second terminal device receives the fourth identifier sent by the management network element includes: The second terminal device receives, by using Wi-Fi, the fourth identifier sent by the management network element.

Optionally, that the second terminal device may send an identifier request message to the management network element includes: The second terminal device sends the identifier request message to the management network element by using sidelink; and that the second terminal device receives the fourth identifier sent by the management network element includes: The second terminal device receives, by using sidelink, the fourth identifier sent by the management network element.

Optionally, that the second terminal device may send an identifier request message to the management network element includes: The second terminal device sends the identifier request message to the management network element by using UWB; and that the second terminal device receives the fourth identifier sent by the management network element includes: The second terminal device receives, by using UWB, the fourth identifier sent by the management network element.

Optionally, that the second terminal device may send an identifier request message to the management network element includes: The second terminal device sends the identifier request message to the management network element by using ultrasonic communications; and that the second terminal device receives the fourth identifier sent by the management network element includes: The second terminal device receives, by using ultrasonic communications, the fourth identifier sent by the management network element.

Optionally, that the second terminal device may send an identifier request message to the management network element includes: The second terminal device sends the identifier request message to the management network element by using a specific communications system (for example, a 5G communications system or a 4G communications system); and that the second terminal device receives the fourth identifier sent by the management network element includes: The second terminal device receives, by using the specific communications system, the fourth identifier sent by the management network element.

Optionally, the identifier request message in Manner 2 may carry a sixth identifier of the first terminal device. For example, the sixth identifier is allocated by the management network element to the first terminal device, but the second terminal device may store the sixth identifier that is allocated to the first terminal device by the management network element. In this way, the management network element sends the fourth identifier of the first terminal device to the second terminal device based on the sixth identifier. It may be understood that, the sixth identifier is used for the management network element and the second terminal device to identify the first terminal device, and is different from the fourth identifier of the first terminal device. The fourth identifier of the first terminal device may be understood as an identifier used by an operator to identify the first terminal device. In other words, when a same terminal device needs to be identified by different objects in different cases, different identifiers may be allocated to the terminal device. For example, when the first terminal device needs to be identified by the second terminal device and the management network element, an identifier of the first terminal device is the sixth identifier; and when the first terminal device needs to be identified by the operator, an identifier of the first terminal device may be the fourth identifier. For example, the sixth identifier may be a number allocated by the management network element to the first terminal device.

Optionally, the second terminal device may receive a second operation instruction; and in response to the second operation instruction, the second terminal device may obtain the fourth identifier. In other words, a user may operate the second terminal device, to trigger the second terminal device to obtain the fourth identifier of the first terminal device. For example, the second terminal device is triggered to send an identifier request message to the first terminal device or the management network element. Optionally, the second operation instruction entered by the user may specify the first terminal device, that is, the user expects to transfer the data of the first service, which is for transmission by the second terminal device, to the first terminal device for transmission.

Optionally, the second terminal device may spontaneously obtain the fourth identifier without involving a user operation. For example, if a distance between the second terminal device and the first terminal device is less than a preset value, the second terminal device obtains the fourth identifier; or the first terminal device is a default transferred-to device.

Optionally, the fourth identifier may be a globally unique temporary identifier (globally unique temporary identity, GUTI) of the first terminal device. Optionally, the GUTI of the first terminal device includes a globally unique AMF identifier (GUAMI) of the first terminal device and a temporary mobile subscriber identity (TMSI) of the first terminal device.

Optionally, the fourth identifier may be a mobile subscriber international ISDN number (MSISDN) of the first terminal device, where ISDN is the abbreviation of an integrated service digital network.

Optionally, the fourth identifier may be an international mobile subscriber identity (IMSI) of the first terminal device.

Optionally, the fourth identifier may be an international mobile equipment identity (IMEI) of the first terminal device.

It may be understood that, step S202 may not exist in the method 200, and the second terminal device may store the fourth identifier of the first terminal device and does not need to obtain the fourth identifier from the first terminal device or the management network element.

S203: The second terminal device sends at least one of a second identifier, the fourth identifier, an identifier of the first QoS flow, an identifier of a first PDU session, or a first packet filter to a second AMF network element.

The second AMF network element may be an AMF network element serving the second terminal device, or the second AMF network element may be an AMF network element of the second terminal device.

Optionally, the second terminal device may receive a second operation instruction of the user; and in response to the second operation instruction, the second terminal device performs S203, that is, the second operation instruction entered by the user on the second terminal device may trigger execution of S203.

Optionally, the user may enter a same operation instruction (for example, the second operation instruction) to trigger S202 and S203, that is, after the user enters a same operation instruction to trigger the second terminal device to perform S202, S203 is performed; or the user may enter different operation instructions to trigger S202 and S203. For example, the user enters the second operation instruction to trigger S202, and the user enters a third operation instruction to trigger S203.

Optionally, when a distance between the first terminal device and the second terminal device is less than a preset value, S203 is performed. In this case, the user does not need to enter an operation instruction to trigger S203.

Optionally, the second terminal device has at least one service, and the at least one service includes the first service; and the method 200 may include: The second terminal device sends a second identifier of the first service to the second AMF network element. In other words, after receiving the second identifier, the second AMF network element may determine that the second terminal device needs to transfer the first service identified by the second identifier. Optionally, the at least one service existing in the second terminal device may be a service corresponding to one application (for example, a first application), or services corresponding to different applications. This is not limited in this embodiment of this application.

Optionally, the second terminal device needs to transfer all services corresponding to an application; and the method 200 may include: The second terminal device sends a second identifier of the first service to the second AMF network element, where the first service corresponds to a first application, the first service may be all services of the first application, and the second identifier may identify the first service or the first application, or the second identifier may identify the first service by identifying the application.

Optionally, the second terminal device may not send the second identifier to the second AMF network element. This indicates that the second terminal device needs to transfer all services of the second terminal device to the first terminal device, and the first service may be all services of the second terminal device.

Optionally, the identifier of the first QoS flow may be a QoS flow identifier (QFI) of the first QoS flow.

Optionally, the first packet filter includes an IP address of the first PDU session. Optionally, the first packet filter is included in a QoS rule of the first service. A function of the first packet filter may be understood as that, the second terminal device maps the data of the first service to the first QoS flow by using the first packet filter, and sends the data of the first service to the second UPF network element. The first packet filter may also be understood as a packet filter corresponding to the first service. The second UPF network element also has a packet filter corresponding to the first packet filter, where the packet filter is used by the second UPF network element to map received data of the first service to the first QoS flow, and send the received data of the first service to the second terminal device.

Optionally, the first packet filter includes a quintuple, and the quintuple included in the first packet filter can uniquely determine the first PDU session and the first QoS flow.

Optionally, S203 includes: The second terminal device sends a transfer request message to the second AMF, where the transfer request message includes at least one of the second identifier, the fourth identifier, the identifier of the first QoS flow, the identifier of the first PDU session, or the first packet filter.

Optionally, if the second terminal device sends at least two of the second identifier, the fourth identifier, the identifier of the first QoS flow, the identifier of the first PDU session, or the first packet filter to the second AMF network element of the second terminal device, the second terminal device may simultaneously send the at least two of the second identifier, the fourth identifier, the identifier of the first QoS flow, the identifier of the first PDU session, or the first packet filter to the second AMF network element of the second terminal device; or may separately send the at least two of the fourth identifier, the identifier of the first QoS flow, the identifier of the first PDU session, or the first packet filter. How the second terminal device sends the second identifier, the fourth identifier, the identifier of the first QoS flow, the identifier of the first PDU session, or the first packet filter to the second AMF network element is not limited in this embodiment of this application. In other words, the second terminal device may send, in a same message to the second AMF network element, the at least two of the second identifier, the fourth identifier, the identifier of the first QoS flow, the identifier of the first PDU session, or the first packet filter; or may send, in different messages to the second AMF network element, the at least two of the second identifier, the fourth identifier, the identifier of the first QoS flow, the identifier of the first PDU session, or the first packet filter.

In other words, in S203, the fourth identifier sent by the second terminal device indicates that the second terminal device needs to transfer the first service to the first terminal device, the identifier of the first QoS flow sent by the second terminal device indicates that the second terminal device is receiving the data of the first service by using the first QoS flow indicated by the identifier of the first QoS flow, and the identifier of the first PDU session sent by the second terminal device indicates that the second terminal device is receiving the data of the first service by using the first PDU session identified by the identifier of the first PDU session.

If S203 includes the identifier of the first PDU session and the identifier of the first QoS flow, S204 is performed; otherwise, S204 is not performed. If S204 is not performed, the second AMF network element may store first description information of the first PDU session and/or second description information of the first QoS flow.

S204: The second AMF network element obtains the first description information of the first PDU session from a second SMF network element based on the identifier of the first PDU session, and/or obtains the second description information of the first QoS flow from the second SMF based on the identifier of the first QoS flow.

Optionally, the second SMF network element may store the first description information of the first PDU session and the second description information of the QoS flow, and S204 includes: The second AMF network element sends a description information request message to the second SMF network element, where the description information request message includes the identifier of the first PDU session and the identifier of the first QoS flow, and the description information request message is used to request the first description information of the first PDU session and the second description information of the first QoS flow.

Optionally, the second AMF network element may further send the third identifier of the second terminal device to the second SMF network element. For example, the description information request message includes the third identifier of the second terminal device, the identifier of the first PDU session, and the identifier of the first QoS flow; and the second SMF network element determines the second terminal device based on the third identifier, determines the first PDU session of the first terminal device based on the identifier of the first PDU session, and determines the first QoS flow in the first PDU session based on the identifier of the first QoS flow.

Optionally, the second AMF network element may simultaneously obtain the first description information of the first PDU session and the second description information of the first QoS flow from the second SMF network element. If the second AMF network element sends the description information request message to the second SMF network element, the second AMF network element may send a description information request message, which carries the identifier of the first PDU session and the identifier of the first QoS flow, and a response message for the description information request message may carry the first description information and the second description information. Optionally, the second AMF network element may separately obtain the first description information of the first PDU session and the second description information of the first QoS flow from the second SMF network element. If the second AMF network element sends the description information request message to the second SMF network element, the second AMF network element may send two description information request messages, where the two description information request messages respectively carry the identifier of the first PDU session and the identifier of the first QoS flow, and two response messages corresponding to the two description information request messages may respectively carry the first description information and the second description information.

Optionally, the first description information includes at least one of a data network name (DNN) of the first PDU session, a session and service continuity (SSC) mode of the first PDU session, and single network slice assistance information (S-NSSAI) of the first PDU session.

Optionally, the second description information includes at least one of a quality of service identifier of the first QoS flow, a guaranteed bit rate (GBR) of the first QoS flow, a guaranteed flow bit rate (GFBR) of the first QoS flow, a maximum flow bit rate (MFBR) of the first QoS flow, an averaging window of the first QoS flow, or a QoS rule of the first QoS flow. The second description information may also be referred to as QoS flow description information.

Optionally, the first description information and/or the second description information may be referred to as information about the first QoS flow, or the information about the first QoS flow includes the first description information and/or the second description information.

Optionally, in S204, the second AMF network element may obtain the second description information, but does not obtain the first description information. For example, the first QoS flow and a second QoS flow are QoS flows of a same PDU session. In this way, when transferring the data of the first service to the first terminal device, the second terminal device may transfer the data of the first service between different QoS flows in the same PDU session.

If S203 includes the fourth identifier, S205 is performed; otherwise, S205 is not performed.

S205: The second AMF network element determines a first AMF network element based on the fourth identifier.

Optionally, if the fourth identifier is the GUTI of the first terminal device, the second AMF network element determines the first AMF network element based on the GUTI of the first terminal device. Optionally, the second AMF network element determines the first AMF network element based on the GUAMI included in the GUTI of the first terminal device.

Optionally, if the fourth identifier is the MSISDN, or IMSI, or IMEI of the first terminal device, the second AMF network element sends the MSISDN, IMSI, or IMEI of the first terminal device to a UDM network element; the UDM network element determines the first AMF network element based on the MSISDN, IMSI, or IMEI of the first terminal device; and the UDM network element sends an identifier of the first AMF network element to the second AMF network element, where the UDM network element is a network element corresponding to the first AMF network element and the second AMF network element, or the UDM network element may be understood as a network element corresponding to the first terminal device and the second terminal device.

It may be understood that there is no limitation on a sequence between S204 and S205, that is, S204 may be performed before S205, after S205, or at a same time as S205.

Optionally, if the first AMF network element and the second AMF network element are a same entity, in S205, the first AMF network element that is determined based on the fourth identifier by the second AMF network element may be a module or a unit that is of the same entity as the second AMF network element but is different from the second AMF network element. Certainly, the first AMF network element and the second AMF network element may be a same module or a same unit of a same entity. This is not limited in this embodiment of this application.

S206: The second AMF network element sends at least one of the fourth identifier, the second identifier, the first packet filter, the first description information, or the second description information to the first AMF network element.

It may be understood that, if the second terminal device sends the second identifier and the fourth identifier to the second AMF network element in S203, the second AMF network element may send the fourth identifier and the second identifier to the first AMF network element in S206; or if the second terminal device does not send the second identifier to the second AMF network element in S203, the second AMF network element may not send the second identifier to the first AMF network element in S206; or if the second terminal device does not send the fourth identifier to the second AMF network element in S203, the second AMF network element may not send the fourth identifier to the first AMF network element in S206. Similarly, if the second terminal device sends the identifier of the first PDU session to the second AMF network element in S203, the second AMF network element can then obtain the first description information in S204; therefore, the second AMF network element may send the first description information to the first AMF network element in S206. If the second terminal device sends the identifier of the first QoS flow to the second AMF network element in S203, the second AMF network element can then obtain the second description information in S204; therefore, the second AMF network element may send the second description information to the first AMF network element in S206. If the second terminal device sends the first packet filter to the second AMF network element in S203, the second AMF network element may then send the first packet filter to the first AMF network element in S206. In other words, content of the information sent by the second AMF network element to the first AMF network element in S206 is determined based on the content sent in S203.

Optionally, if the second AMF network element sends at least two of the fourth identifier, the second identifier, the first packet filter, the first description information, or the second description information to the first AMF network element, the second AMF network element may simultaneously send the at least two of the fourth identifier, the second identifier, the first packet filter, the first description information, or the second description information to the first AMF network element; or may separately send the at least two of the fourth identifier, the second identifier, the first packet filter, the first description information, or the second description information. A manner in which the second AMF network element sends the fourth identifier, the second identifier, the first packet filter, the first description information, or the second description information to the first AMF network element is not limited in this embodiment of this application. In other words, the second AMF network element may send, in a same message to the first AMF network element, the at least two of the fourth identifier, the second identifier, the first packet filter, the first description information, or the second description information; or may send, in different messages to the first AMF network element, the at least two of the fourth identifier, the second identifier, the first packet filter, the first description information, or the second description information.

Optionally, that the second AMF network element sends the first packet filter to the first AMF network element includes: The second AMF network element sends a QoS rule to the first AMF network element, where the QoS rule includes the first packet filter.

Optionally, S206 includes: The second AMF network element sends a transfer request to the first AMF network element, where the transfer request message includes at least one of the fourth identifier, the second identifier, the first packet filter, the first description information, or the second description information.

Optionally, if S206 includes the fourth identifier, the method 200 further includes: The second AMF network element determines the first terminal device based on the fourth identifier, so as to perform S207. In other words, the second AMF network element needs to determine, based on the fourth identifier, a target device to which the to-be-transferred data is to be transferred, that is, the first terminal device.

It may be understood that, if S203 includes the fourth identifier, in S205, the second AMF network element may determine the first AMF network element based on the fourth identifier. If the first AMF network element is only an AMF network element of the first terminal device, in S206, the second AMF network element may not send the fourth identifier to the first AMF network element. In other words, if the first AMF network element can uniquely determine the first terminal device, the first AMF network element does not need to learn of the fourth identifier. If the first AMF network element cannot uniquely determine the first terminal device, the first AMF network element needs to determine the first terminal device by using the fourth identifier, so as to perform S207.

Optionally, the method 200 further includes: The second AMF network element sends identification information of the second SMF network element and/or identification information of the second UPF network element to the first AMF network element, where the identification information of the second SMF network element can identify the second SMF network element, for example, may be an ID, an IP address, or a fully qualified domain name (FQDN) of the second SMF network element; and the identification information of the second UPF network element can identify the second UPF network element, for example, may be an ID, an IP address, or an FQDN of the second UPF. Optionally, the second AMF network element may send, in S206, the identification information of the second SMF network element and/or the identification information of the second UPF network element to the first AMF network element; or may send, in another step different from S206, the identification information of the second SMF network element and/or the identification information of the second UPF network element to the first AMF network element. This is not limited in this embodiment of this application.

Optionally, if the first AMF network element receives the identification information of the second SMF network element and/or the identification information of the second UPF network element, before S207, the first AMF network element sends a first identifier to the first terminal device, where the first identifier is used to identify information related to the first description information and/or the second description information, or the first identifier is used to identify information related to the information about the first QoS flow. Alternatively, the first identifier may be understood as that the first description information and/or the second description information is related to the second SMF network element and/or the second UPF network element; or the first identifier may be understood as that the information about the first QoS flow is associated with the second SMF network element and/or the second UPF network element. In other words, because the information about the first QoS flow, the second SMF network element, and the second UPF network element are all related to transmission of the data of the first service between the second terminal device and the second UPF network element, the first AMF network element may allocate a first identifier to the first terminal device to identify these association relationships. The first identifier may be referred to as a transfer identifier (ID).

Optionally, if the second AMF network element and the first AMF network element are a same entity, that the second AMF network element sends at least one of the fourth identifier, the second identifier, the first packet filter, the first description information, or the second description information to the first AMF network element in S206 may be understood as: A module that belongs to the second AMF network element in the same entity transfers the at least one of the fourth identifier, the second identifier, the first description information, or the second description information to a module that belongs to the first AMF network element in the same entity; or may be understood as that: Step S206 does not exist, and the entity to which the second AMF network element and the first AMF network element belong stores the at least one of the fourth identifier, the second identifier, the first description information, or the second description information. In other words, if the second AMF network element and the first AMF network element are a same entity, it may be understood that there is a step of mutual sending, or it may be understood that there is no step of mutual sending. This is not limited in this embodiment of this application.

S207: The first AMF network element sends at least one of the first description information, the second description information, the second identifier, or the first packet filter to the first terminal device.

It may be understood that the content sent by the first AMF network element to the first terminal device is determined based on the content in S206. If the first AMF network element receives the first description information in S206, the first AMF network element sends the first description information to the first terminal device in S207. If the first AMF network element receives the second description information in S206, the first AMF network element sends the second description information to the first terminal device in S207. If the first AMF network element receives the second identifier, the first AMF network element sends the second identifier to the first terminal device in S207. If the first AMF network element receives the first packet filter in S206, the first AMF network element sends the first packet filter to the first terminal device in S207.

Optionally, that the first AMF network element sends the first packet filter to the first terminal device includes: The first AMF network element sends a QoS rule to the first terminal device, where the QoS rule includes the first packet filter.

Optionally, after S207, the method 200 further includes: The first terminal device starts, based on the first service identified by the second identifier, an application related to the first service. In this way, the first terminal device may start the application related to the first service in advance, to prepare, in advance, for receiving the data of the first service, thereby helping reduce a delay in receiving the data of the first service.

Optionally, if the information about the first QoS flow includes the first description information and/or the second description information, S207 may be replaced with: The first AMF network element sends at least one of the information about the first QoS flow, the second identifier, or the first packet filter to the first terminal device. Optionally, the information about the first QoS flow may include information other than the first description information and/or the second description information, for example, information about whether the first QoS flow is allowed to be transferred, information about whether the first QoS flow is allowed to be shared with another application, information about whether the first PDU session is allowed to be transferred, and information about whether the first PDU session supports a local data network (LADN).

Optionally, if the first AMF network element has allocated the first identifier to the first terminal device before S207, the first AMF network element may send the first identifier to the first terminal device in S207.

Optionally, if the first AMF network element sends at least two of the first description information, the second description information, the second identifier, or the first packet filter to the first terminal device, the first AMF network element may simultaneously send the at least two of the first description information, the second description information, the second identifier, or the first packet filter to the first terminal device; or may separately send the at least two of the first description information, the second description information, the second identifier, or the first packet filter. In this embodiment of this application, that the first AMF network element sends the first description information, the second description information, the second identifier, or the first packet filter to the first terminal device is not limited. In other words, the first AMF network element may send, in a same message, the at least two of the first description information, the second description information, the second identifier, or the first packet filter to the first terminal device; or may send, in different messages, the at least two of the first description information, the second description information, the second identifier, or the first packet filter to the first terminal device.

S208: The first terminal device determines, based on the first description information, whether there is a PDU session corresponding to the first description information, and/or determines, based on the second description information, whether there is a QoS flow corresponding to the second description information.

If the first terminal device receives the first description information in S207, the first terminal device determines, based on the first description information, whether there is a PDU session corresponding to the first description information. If the first terminal device receives the second description information in S207, the first terminal device determines, based on the second description information, whether there is a QoS flow corresponding to the second description information. If the first terminal device receives the first description information and the second description information in S207, the first terminal device determines, based on the first description information, whether there is a PDU session corresponding to the first description information; and determines, based on and the second description information, whether there is a QoS flow corresponding to the second description information. If the first terminal device receives the first description information and the second description information in S207, the first terminal device determines, based on the first description information, whether there is a PDU session corresponding to the first description information. In other words, even if the first terminal device receives both the first description information and the second description information, the first terminal device may only determine, based on the first description information, whether there is a PDU session corresponding to the first description information.

Optionally, in S208, the first terminal device determines, in established PDU sessions, whether there is a PDU session whose description information is consistent with the first description information. In other words, the first terminal device determines, in established PDU sessions, whether there is a PDU session whose description information is the first description information. If the PDU session exists, it indicates that there is a PDU session corresponding to the first description information. The first terminal device determines, in established QoS flow, whether there is a QoS flow whose description information is consistent with the second description information. In other words, the first terminal device determines, in established QoS flow, whether there is a QoS flow whose description information is the second description information. If the QoS flow exists, it indicates that there is a QoS flow corresponding to the second description information.

Optionally, if the first terminal device determines that there is a PDU session corresponding to the first description information, the first terminal device may continue to determine, based on the second description information, whether there is a QoS flow corresponding to the second description information; or if the first terminal device determines that there is no PDU session corresponding to the first description information, the first terminal device may not need to determine, based on the second description information, whether there is a QoS flow corresponding to the second description information. Since a QoS flow belongs to a PDU session, if there is no PDU session corresponding to the first description information in PDU sessions established by the first terminal device, it indicates that there is no QoS flow corresponding to the second description information.

A discussion is made in different cases below.

Case 1: If the first terminal device determines, in S208, that there is no PDU session corresponding to the first description information, the first terminal device performs S209*a*.

S209*a*: The first terminal device sends a PDU session establishment request message to the first AMF network element, where the PDU session establishment request message includes the first description information and the second description information.

Optionally, if the first AMF network element has sent the first identifier to the first terminal device, in S209*a*, the first terminal device may send the PDU session establishment request message and the first identifier to the first AMF network element. If the first identifier identifies that the first description information and the second description information are related to the second SMF network element and the second UPF network element, the first AMF network element may determine the second SMF network element as a first SMF network element, and determine the second UPF network element as a first UPF network element. In other words, when a PDU session is newly established, the first AMF network element may use, based on the first identifier, the second SMF network element of the second terminal device as a first SMF network element of the first terminal device; and use the second UPF network element of the second terminal device as a first UPF network element of the first terminal device. In this way, the SMF network element of the first terminal device may be the same as that of the second terminal device, and the UPF network element of the first terminal device may be the same as that of the second terminal device, thereby simplifying a design. Certainly, the first identifier may also indicate that the first description information and the second description information are related to the second SMF network element, or related to the second UPF network element. If the first description information and the second description information are related to the second SMF network element, the first AMF network element may determine the second SMF network element as the first SMF network element; or if the first description information and the second description information are related to the second UPF network element, the first AMF network element may determine the second UPF network element as the first UPF network element.

It may be understood that the first identifier may not exist in the method 200. If the first terminal device sends the PDU session establishment request message to the first AMF network element, the first AMF network element may determine a new first SMF network element and a new first UPF network element without depending on the second SMF network element and the second UPF network element of the second terminal device.

S210*a*: The first AMF network element sends the PDU session establishment request message to the first SMF network element, where the PDU session establishment request message includes the first description information and the second description information.

S211*a*: The first SMF network element establishes a second PDU session between the first UPF network element and the first terminal device based on the first description information, and the first SMF network element establishes a second QoS flow between the first UPF network element and the first terminal device based on the second description information.

The second QoS flow is a QoS flow in the second PDU session, or a PDU session corresponding to the second QoS flow is the second PDU session, or the second QoS flow belongs to the second PDU session. After the second PDU session is established, the first SMF network element, the first UPF network element, and the first AMF network element can learn of a second IP address of the second PDU session.

Specifically, for a process of establishing the second PDU session and the second QoS flow, refer to descriptions in a current technology. To avoid repetition, details are not described in this embodiment of this application.

Figure 3:
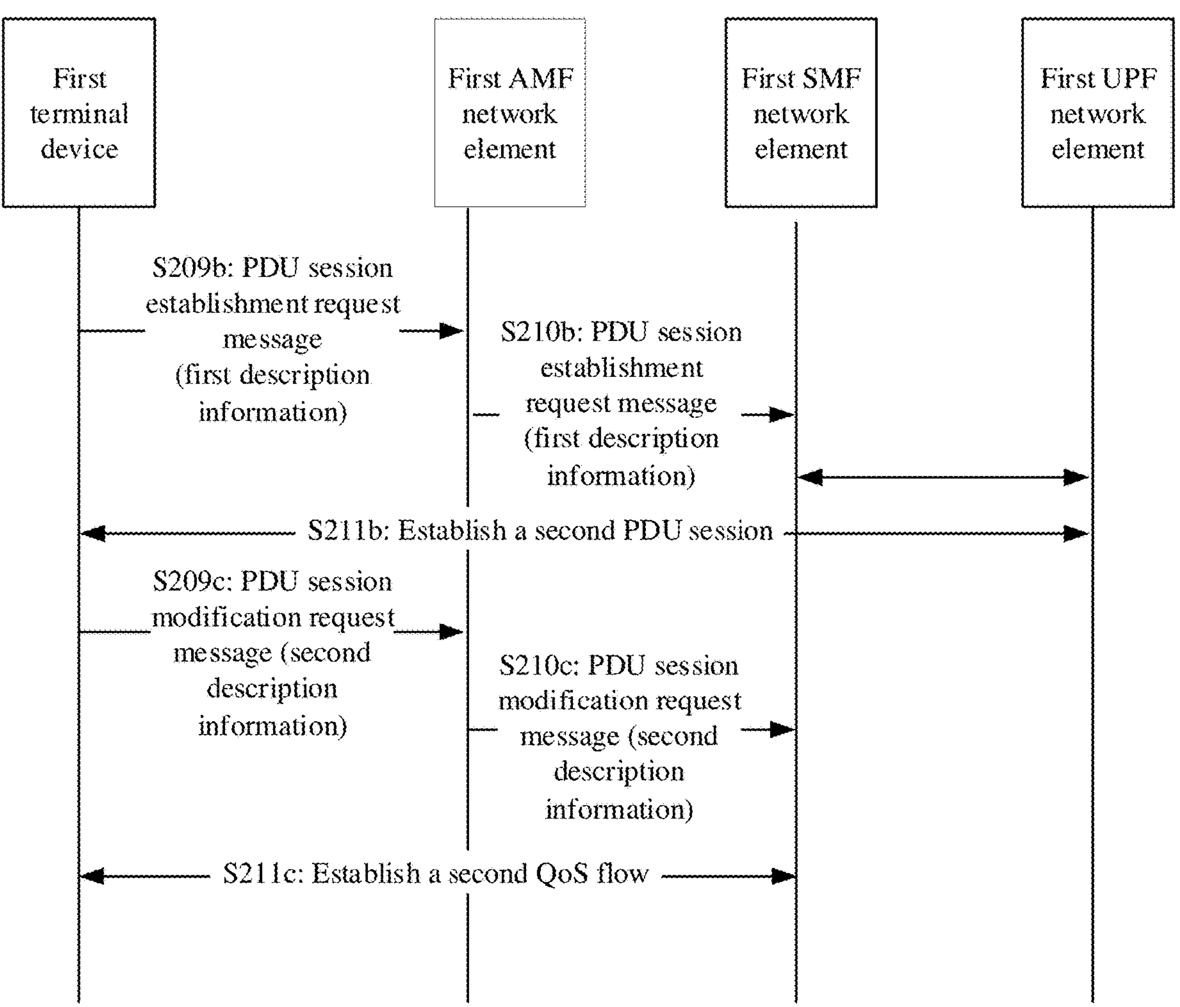

In an alternative manner of S209*a* to S211*a*, as shown in FIG. 3, the method 200 may include the following steps.

S209*b*: The first terminal device sends a PDU session establishment request message to the first AMF network element, where the PDU session establishment request message includes the first description information.

S210*b*: The first AMF network element sends the PDU session establishment request message to a first SMF network element, where the PDU session establishment request message includes the first description information.

S211*b*: The first SMF network element establishes a second PDU session between the first UPF network element and the first terminal device based on the first description information.

S209*c*: The first terminal device sends a PDU session modification request message to the first AMF network element, where the PDU session modification request message includes the second description information.

S210*c*: The first AMF network element sends the PDU session modification request message to the first SMF network element, where the PDU session modification request message includes the second description information.

S211*c*: The first SMF network element establishes a second QoS flow between the first UPF network element and the first terminal device based on the second description information.

Optionally, the second QoS flow established in S211*c* or S211*a* may be specifically divided into two segments: a first segment is a user plane connection between the first UPF network element and a base station of the first terminal device, that is, an N3 connection; and a second segment is a user plane connection between the base station of the first terminal device and the first terminal device, that is, a DRB.

In other words, in S209*a* to S211*a*, the PDU session establishment request message sent by the first terminal device to the first AMF network element includes the first description information and the second description information, and the first SMF network element establishes the second QoS flow simultaneously when establishing the second PDU session based on the first description information and the second description information. S209*b* to S211*b* are a process in which the second PDU session is first established, and S209*b* to S211*b* are a process in which the second QoS flow is established after the second PDU session is established.

Optionally, if the first terminal device receives the first packet filter in S207, S212 is performed.

After determining that the second PDU session is established, the first terminal device may perform S212.

S212: The first terminal device changes a first IP address of the first PDU session included in the first packet filter to a second IP address of the second PDU session, to obtain a second packet filter.

Optionally, S212 includes: The first terminal device changes the first IP address of the first PDU session included in the first packet filter to the second IP address of the second PDU session, and changes a first port number that is included in the first packet filter and that corresponds to the first IP address to a second port number corresponding to the second IP address, to obtain a second packet filter.

S213: The first terminal device sends the second packet filter to the first AMF network element.

Optionally, in S213, the first terminal device may send a PDU session modification message to the first AMF network element, where the PDU session establishment modification message includes the second packet filter.

Optionally, S213 includes: The first terminal device sends a QoS rule to the first AMF network element, where the QoS rule includes the second packet filter.

Optionally, for the embodiment in FIG. 3, S213 and S209*c* may use a same message. In other words, a same PDU session modification message includes both the second description information and the second packet filter.

S214: The first AMF network element sends the second packet filter to the first SMF network element, and the first SMF network element sends the second packet filter to the first UPF network element.

Optionally, that the first SMF network element sends the second packet filter to the first UPF network element includes: The first SMF network element sends the second packet filter to the first UPF network element by using a packet detection information (PDI) field in a packet detection rule (PDR).

Optionally, S214 includes: The first AMF network element sends a QoS rule to the first SMF network element; and the first SMF network element sends the QoS rule to the first UPF network element, where the QoS rule includes the second packet filter.

Optionally, after the first SMF network element receives the second packet filter, the first SMF network element exchanges a source IP address and a port number corresponding to the source IP address that are included in the second packet filter with a destination IP address and a port corresponding to the destination IP address that are included in the second packet filter, to obtain a third packet filter; and the first SMF sends the third packet filter to the first UPF network element, so that the first UPF network element obtains the third packet filter.

For example, the first packet filter is "IP 1, Port 1, IP 3, Port 3, TCP", where the IP 1 is the IP address of the first PDU session. After S212, the first packet filter is changed to the second packet filter "IP 2, Port 1, IP 3, Port 3, TCP", where the IP 2 is the IP address of the second PDU session, and the first SMF network element exchanges positions of the IP 2 and the Port 1 (the source IP address and the port number corresponding to the source IP address) with positions of the IP 3 and the Port 3 (the destination IP address and the port number corresponding to the destination IP address) in the second packet filter, to obtain the third packet filter "IP 3, Port 3, IP 2, Port 1, TCP".

Optionally, that the first SMF network element sends the third packet filter to the first UPF network element includes:

The first SMF network element sends the third packet filter to the first UPF network element by using a PDI field in a PDR.

Optionally, the first SMF network element sends a QoS rule to the first UPF network element, where the QoS rule includes the third packet filter.

S215: The first AMF network element sends a third IP address of the first UPF network element and/or the second IP address of the second PDU session to the second AMF network element.

The first AMF network element may learn of the third IP address of the first UPF network element corresponding to the second PDU session, and after the second PDU session is established, the first AMF network element may also learn of the second IP address of the second PDU session.

Optionally, if the second AMF network element sends a transfer request message to the first AMF network element in S206, where the transfer request message includes at least one of the fourth identifier, the second identifier, the first description information, or the second description information, in S215, the first AMF network element may send a response message for the transfer request message to the second AMF network element, where the response message for the transfer request message includes the third IP address of the first UPF network element and/or the second IP address of the second PDU session.

Optionally, the first AMF network element may simultaneously send the third IP address of the first UPF network element and the second IP address of the second PDU session to the second AMF network element; or may separately send the third IP address of the first UPF network element and the second IP address of the second PDU session to the second AMF network element. Optionally, the first AMF network element may send, by using a same message, the third IP address of the first UPF network element and the second IP address of the second PDU session to the second AMF network element; or may send, by using different messages, the third IP address of the first UPF network element and the second IP address of the second PDU session to the second AMF network element. In S215, the first AMF network element sends the second IP address of the second PDU session to the second AMF network element; therefore, S215 needs to be performed after the step of establishing the second PDU session. Therefore, if the first AMF network element may simultaneously send the third IP address of the first UPF network element and the second IP address of the second PDU session to the second AMF network element, S215 may be performed after S211*b* or S210*a*, and a sequence between S215 and another step is not limited. Optionally, if the first AMF network element separately sends the third IP address of the first UPF network element and the second IP address of the second PDU session to the second AMF network element, the first AMF network element may send the second IP address of the second PDU session to the second AMF network element after S211*b* or S210*a*; and the first AMF network element may send the third IP address of the first UPF network element to the second AMF network element after the first AMF network element determines the first UPF network element. There is no any limitation on other steps in this embodiment of this application.

It may be understood that the second IP address of the second PDU session may also be understood as an IP address of the first terminal device.

Optionally, if the second AMF network element and the first AMF network element are a same entity, that the first AMF network element sends the third IP address of the first UPF network element and/or the second IP address of the second PDU session to the second AMF network element in S215 may be understood as: A module that belongs to the first AMF network element in the same entity transfers the third IP address of the first UPF network element and/or the second IP address of the second PDU session to a module that belongs to the second AMF network element in the same entity; or may be understood as that: Step S215 does not exist, and the entity to which the first AMF network element and the second AMF network element belong stores the third IP address of the first UPF network element and/or the second IP address of the second PDU session. In other words, if the second AMF network element and the first AMF network element are a same entity, it may be understood that there is a step of mutual sending, or it may be understood that there is no step of mutual sending. This is not limited in this embodiment of this application.

S216: The second AMF network element sends the third IP address and/or the second IP address of the second PDU session to the second SMF network element, and the second SMF network element sends the third IP address of the first UPF network element and/or the second IP address of the second PDU session to the second UPF network element.

If the first AMF network element sends the third IP address of the first UPF network element to the second AMF network element in S215, in S216, the second AMF network element sends the third IP address of the first UPF network element to the second SMF network element, and the second SMF network element sends the third IP address of the first UPF network element to the second UPF network element. If the first AMF network element sends the second IP address of the second PDU session to the second AMF network in S215, in S216, the second AMF network element sends the second IP address of the second PDU session to the second SMF, and the second SMF network element sends the second IP address of the second PDU session to the second UPF network element. If the first AMF network element sends the third IP address of the first UPF network element and the second IP address of the second PDU session to the second AMF network element in S215, in S216, the second AMF network element sends the third IP address of the first UPF network element and the second IP address of the second PDU session to the second SMF network element, and the second SMF network element sends the third IP address of the first UPF network element and the second IP address of the second PDU session to the second UPF network element. In other words, the content obtained by the second AMF network element in S215 is the same as the content sent to the second UPF network element in S216.

It may be understood that a sequence between S215 or S216 and any one of steps S212 to S214 is not limited. S215 or S216 may be performed before, after, or at the same time as any one of steps S212 to S214.

S217: The second UPF network element receives the data of the first service from the application server.

Optionally, the data of the first service in S217 may be the same as the data of the first service in S201.

Optionally, the data of the first service in S217 may be different from the data of the first service in S201. For example, the data of the first service in S201 may be first data of the first service, the data of the first service in S217 may be second data of the first service, and the first data is different from the second data. In other words, the second UPF network element may send the first data of the first service to the second terminal device by using the first QoS, and the second UPF network element may send the second data of the first service to the first terminal device by using the second QoS flow corresponding to the first UPF network element. In this way, transfer of the data of the first service may be implemented, so that a recipient is transferred from the original second terminal device to the new first terminal device.

Optionally, there may be some same data and some different data between the data of the first service in S217 and the data of the first service in S201. In other words, the same data may be sent to the second terminal device in S201, or may also be sent to the first terminal device after S217; and the different data is separately sent to the second terminal device in S201, and sent to the first terminal device after S217. In other words, a same part of data between the data of the first service in S201 and the data of the first service in S217 may be sent to the second terminal device and the first terminal device respectively by using two different paths, and the different part of data may be sent to the second terminal device and the first terminal device by using two different paths.

Optionally, S201 may be performed before S201 to S216. In other words, before S217, the data of the first service is sent to the second terminal device by using the second UPF network element. In S216, when the second UPF network element obtains the third IP address of the first UPF network element and the second IP address of the second PDU session, after receiving the data of the first service in S217, the second UPF network element may send the data of the first service to the first UPF network element. In this way, seamless transfer can be implemented to avoid a delay, thereby helping improve user experience.

S218: The second UPF network element changes a destination address of the data of the first service to the second IP address of the second PDU session.

The second IP address of the second PDU session is obtained based on S216, and the data of the first service may be the data of the first service received in S217.

S219: The second UPF network element sends the data of the first service in S217 to the first UPF network element based on the third IP address of the first UPF network element.

Optionally, if the first UPF network element and the second UPF network element are a same entity, in S219, the second UPF network element transmits, based on the third IP address of the first UPF network element, the data of the first service to a module or a unit that is of the same entity as the second UPF network element but is different from the second UPF network element. Certainly, the first UPF network element and the second UPF network element may be a same module or a same unit of a same entity. This is not limited in this embodiment of this application. In other words, if the second UPF network element and the first UPF network element are a same entity, it may be understood that there is a step of mutual sending, or it may be understood that there is no step of mutual sending. This is not limited in this embodiment of this application.

Optionally, with reference to functions of the first identifier, if the first terminal device sends the first identifier to the first AMF network element in S209*a*, the first AMF network element determines the second UPF network element as the first UPF network element, and then the second UPF network element and the first UPF network element are a same network element. In this case, the third IP address of the first UPF network element may not exist in S215 and S216, and S219 may not exist. In other words, the process in which the second UPF network element needs to determine the first UPF network element based on the third IP address does not exist. After determining the second UPF network element as the first UPF network element, the first AMF network element may send the second packet filter in S214 to the first UPF network element.

S220: The first UPF network element receives the data of the first service, and sends, based on the second packet filter by using the second QoS flow, the data of the first service to the first terminal device.

Optionally, if the first UPF network element receives a third packet filter, in an alternative manner of S220, the first UPF network element receives the data of the first service, and sends, based on the third packet filter by using the second QoS flow, the data of the first service to the first terminal device.

Optionally, if the first UPF network element receives the second packet filter in S214, S220 includes: The first UPF network element obtains a third packet filter based on the second packet filter. Optionally, the first UPF network element exchanges a source IP address and a port number corresponding to the source IP address that are included in the second packet filter with a destination IP address and a port corresponding to the destination IP address that are included in the second packet filter, to obtain the third packet filter; and the first UPF network element sends, based on the third packet filter, the data of the first service to the first terminal device by using the second QoS flow. For example, the third packet filter is "IP 3, Port 3, IP 2, Port 1, TCP". The first UPF network element sends, based on the IP 2 in third packet filter, the data of the first service to the first terminal device.

Optionally, the third packet filter or the second packet filter can uniquely determine the second PDU session and the second QoS flow.

Optionally, if the first UPF network element receives the second packet filter, the first UPF network element may not perform any processing. To be specific, the first UPF network element can recognize that a front part of the second packet filter is the destination IP address, that is, the source IP address in the second packet filter from the first SMF network element can be actually used as a destination IP address of the first UPF network element. In other words, the first UPF network element can identify content in the second packet filter and does not need to perform any processing.

Figure 2A:
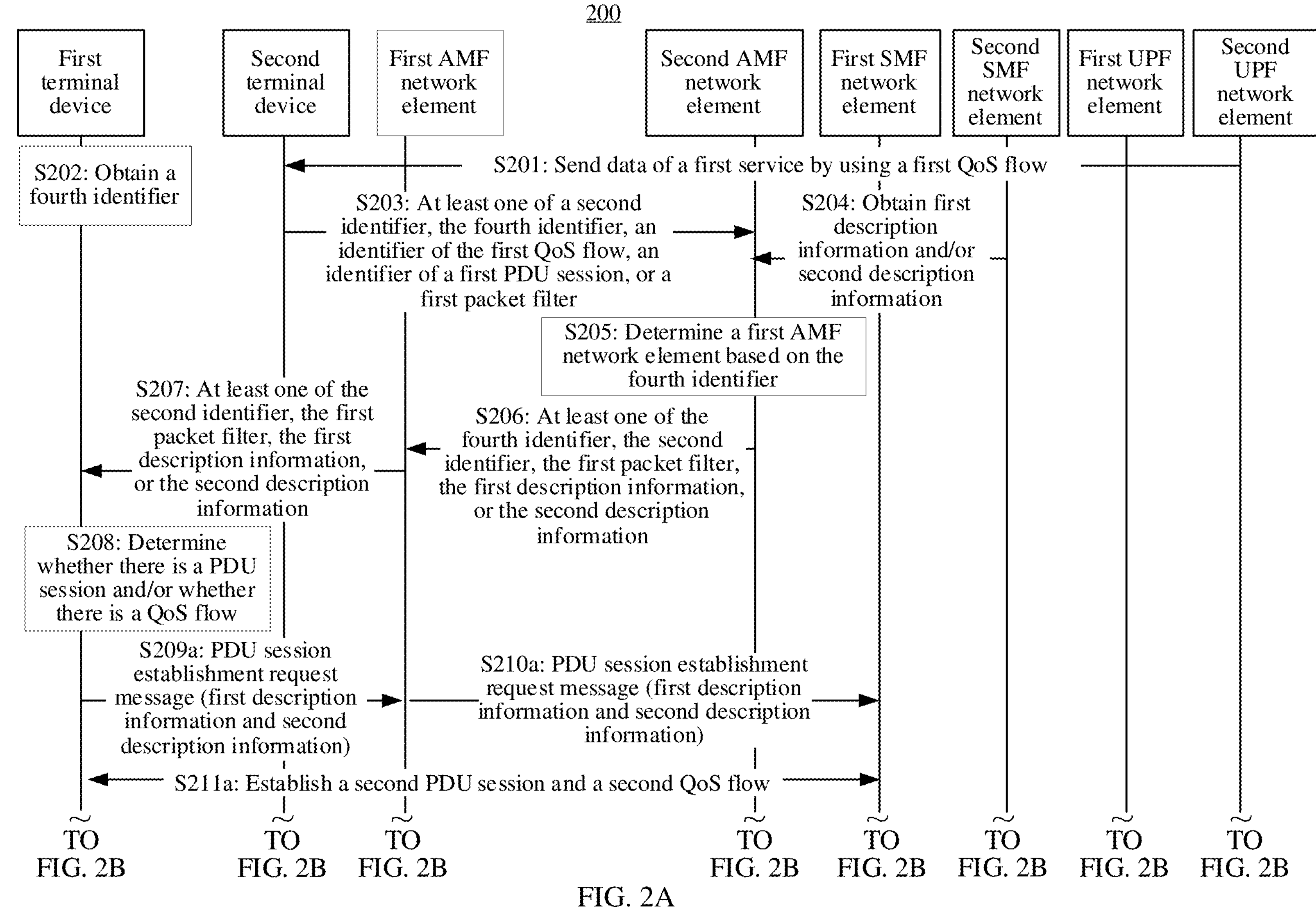
Figure 2B:
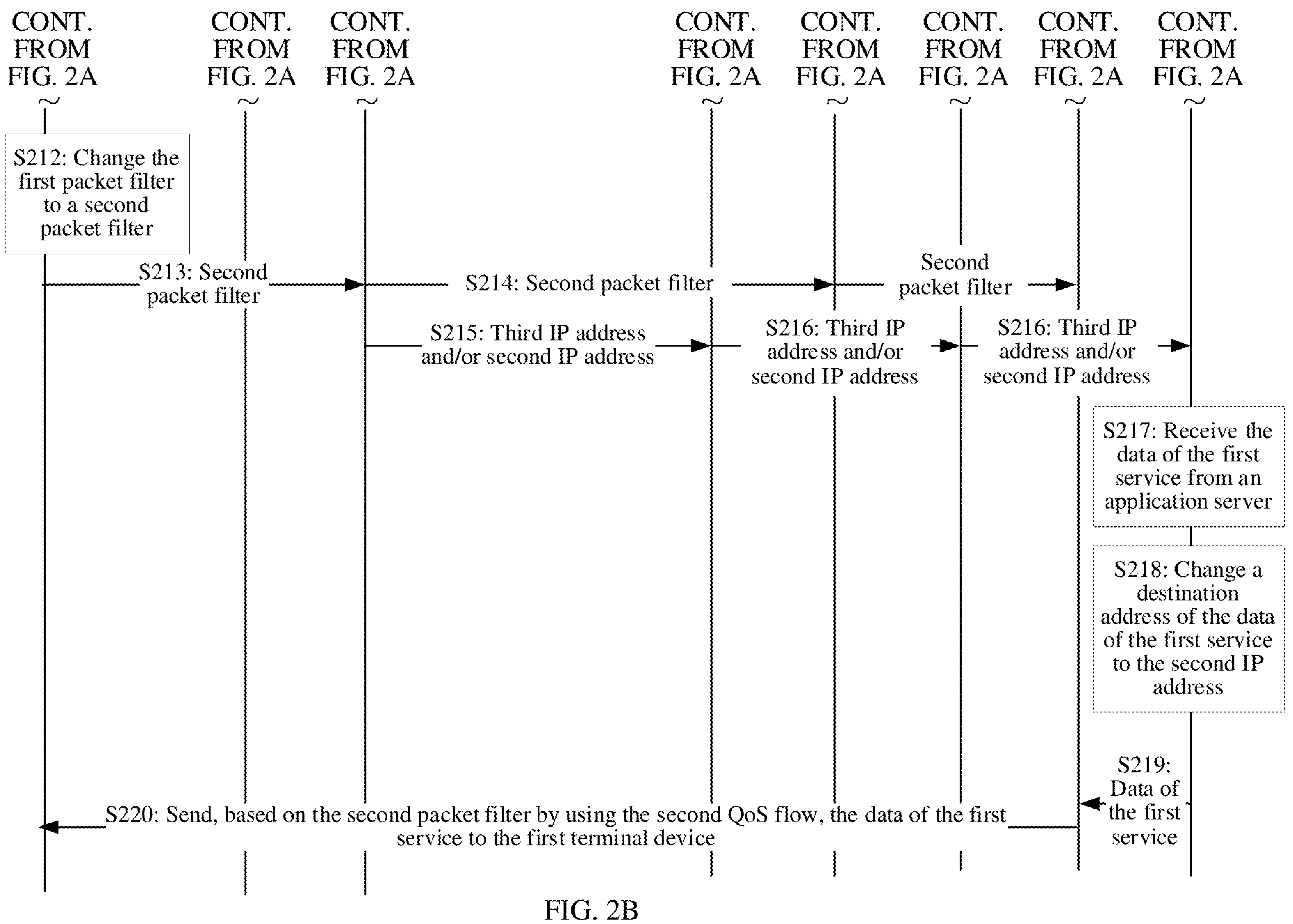
Figure 4:
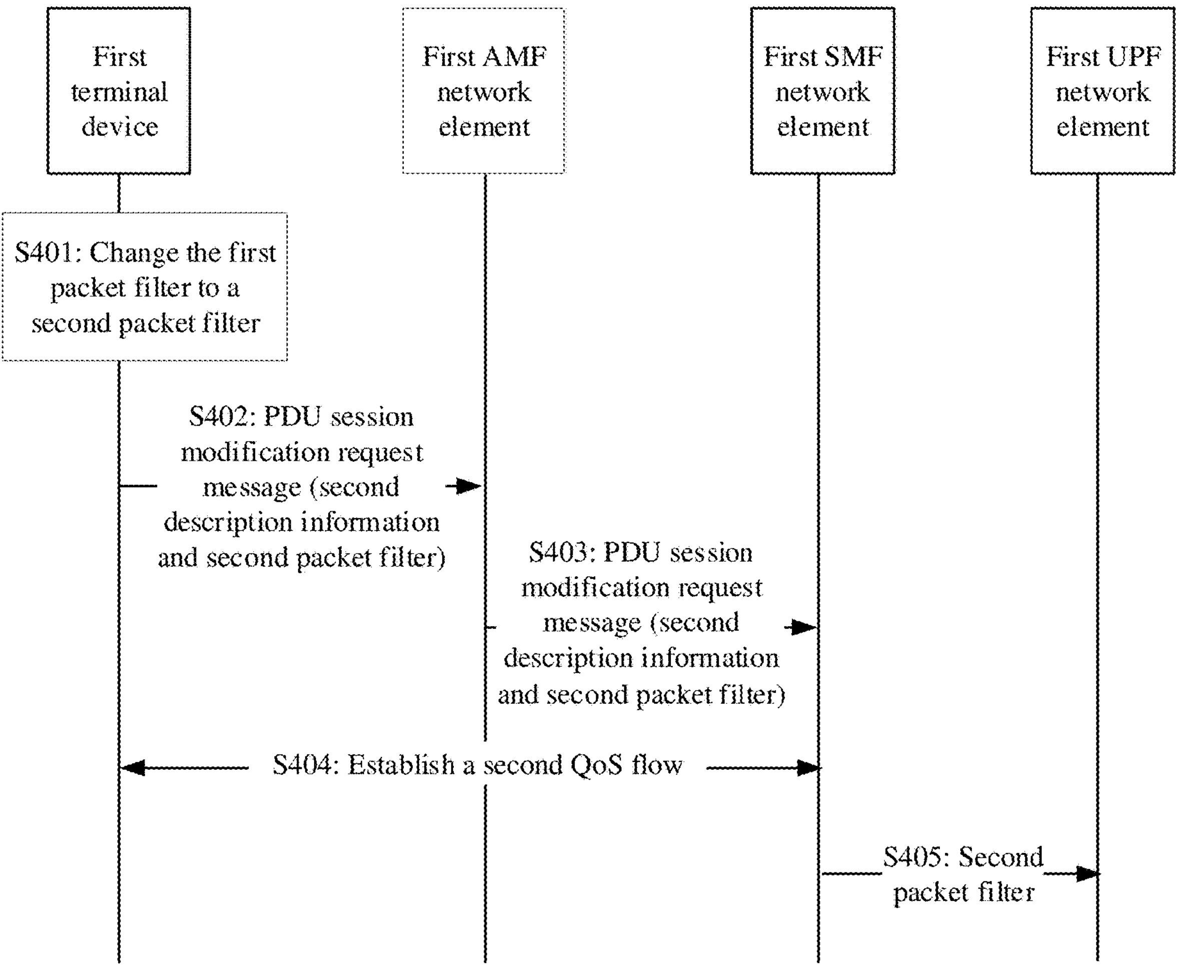

It may be understood that, the method embodiment in FIG. 2A and FIG. 2B describes a case in which the first terminal device determines in S208 that there is neither a PDU session corresponding to the first description information nor a QoS flow corresponding to the second description information. If the first terminal device determines in S208 that there is a PDU session corresponding to the first description information but no QoS flow corresponding to the second description information, the existent PDU session corresponding to the first description information is the second PDU session. Then a specific process is shown in FIG. 4. In a method embodiment shown in FIG. 4, after S201 to S208 are performed, the following process is performed and includes the following steps.

S401: The first terminal device changes a first IP address of the first PDU session included in the first packet filter to a second IP address of a second PDU session, to obtain a second packet filter.

Optionally, S401 includes: The first terminal device changes the first IP address of the first PDU session included in the first packet filter to the second IP address of the second PDU session, and changes a first port number that is included in the first packet filter and that corresponds to the first IP address to a second port number corresponding to the second IP address, to obtain a second packet filter.

It may be understood that, if the first terminal device receives the first packet filter in S207, S401 is performed.

S402: The first terminal device sends a PDU session modification request message to the first AMF network element, where the PDU session modification request message includes the second description information and the second packet filter.

Optionally, in an alternative manner of S402, the first terminal device may send a PDU session modification request message to the first AMF network element, where the PDU session modification request message includes the second description information; and the first terminal device may send another message to the first AMF network element, where the another message includes the second packet filter. In other words, the second packet filter and the second description information may be carried in a same message, or may be carried in different messages.

Optionally, S402 includes: The first terminal device sends the PDU session modification request message to the first AMF network element, where the PDU session modification request message includes the second description information and a QoS rule, and the QoS rule includes the second packet filter.

The PDU session modification request message in S402 corresponds to the second PDU session. In other words, the PDU session modification request message in S402 is to modify the PDU session that exists in the first terminal device and that corresponds to the first description information.

S403: The first AMF network element sends the PDU session modification request message in S402 to a first SMF network element, where the PDU session modification request message includes the second description information and the second packet filter.

Optionally, similar to an alternative manner of S402, in an alternative manner of S403, the first AMF network element may send a PDU session modification request message to the first SMF network element, where the PDU session modification request message includes the second description information; and the first AMF network element may send another message to the first SMF network element, where the another message includes the second packet filter. In other words, the second packet filter and the second description information may be carried in a same message or may be carried in different messages.

Optionally, S403 includes: The first AMF network element sends the PDU session modification request message in S402 to the first SMF network element, where the PDU session modification request message includes the second description information and a QoS rule, and the QoS rule includes the second packet filter.

S404: The first SMF network element establishes, based on the second description information, a second QoS flow between a first UPF network element and the first terminal device.

Optionally, the second QoS flow may be specifically divided into two segments: a first segment is a user plane connection between the first UPF network element and a base station of the first terminal device, that is, an N3 connection; and a second segment is a user plane connection between the base station of the first terminal device and the first terminal device, that is, a DRB.

Specifically, for a process of establishing the second QoS flow, refer to descriptions in a current technology. To avoid repetition, details are not described in this embodiment of this application.

S405: The first SMF network element sends the second packet filter to the first UPF network element.

Optionally, S405 includes: The first SMF network element sends a QoS rule to the first UPF network element, where the QoS rule includes the second packet filter.

Optionally, S405 includes: The first SMF network element sends the second packet filter to the first UPF network element by using a PDI field in a PDR.

Optionally, in an alternative manner of S405, the first SMF network element exchanges a source IP address and a port number corresponding to the source IP address that are included in the second packet filter with a destination IP address and a port corresponding to the destination IP address that are included in the second packet filter, to obtain a third packet filter, and then the first SMF sends the third packet filter to the first UPF network element.

For example, the first packet filter is "IP 1, Port 1, IP 3, Port 3, and TCP", where the IP 1 is the IP address of the first PDU session. After S212, the first packet filter is changed to the second packet filter "IP 2, Port 1, IP 3, Port 3, TCP", where the IP 2 is the IP address of the second PDU session, and the first SMF network element exchanges positions of the IP 2 and the Port 1 (the source IP address and the port number corresponding to the source IP address) with positions of the IP 3 and the Port 3 (the destination IP address and the port number corresponding to the destination IP address) in the second packet filter, to obtain the third packet filter "IP 3, Port 3, IP 2, Port 1, TCP".

Optionally, the first SMF network element sends a QoS rule to the first UPF network element, where the QoS rule includes the third packet filter.

Optionally, that the first SMF network element sends the third packet filter to the first UPF network element includes: The first SMF network element sends the third packet filter to the first UPF network element by using a PDI field in a PDR.

It needs to be noted that there is no limitation on a sequence between S404 and S405, that is, S404 may be performed before, after, or at the same time as S405. In other words, there is no limitation on a sequence between a process in which the first SMF network element establishes the second QoS flow and a process in which the first SMF network element sends the second packet filter.

For steps after S405, refer to S215 to S220. It needs to be emphasized that, because there is no PDU session corresponding to the first description information in the processes shown in FIG. 2A, FIG. 2B and FIG. 3, S215 needs to be performed after the second PDU session is established. There is a PDU session corresponding to the first description information in FIG. 4, and S215 may be performed after the first AMF network element receives the PDU session modification request message in S402. There is no limitation on a sequence between S215 and a step after S402.

In other words, FIG. 4 may be an embodiment in combination with FIG. 2A and FIG. 2B; and S201 to S208 in FIG. 2A and FIG. 2B, S401 to S405 in FIG. 4, and S215 to S220 in FIG. 2A and FIG. 2B may form an embodiment.

Figure 5:
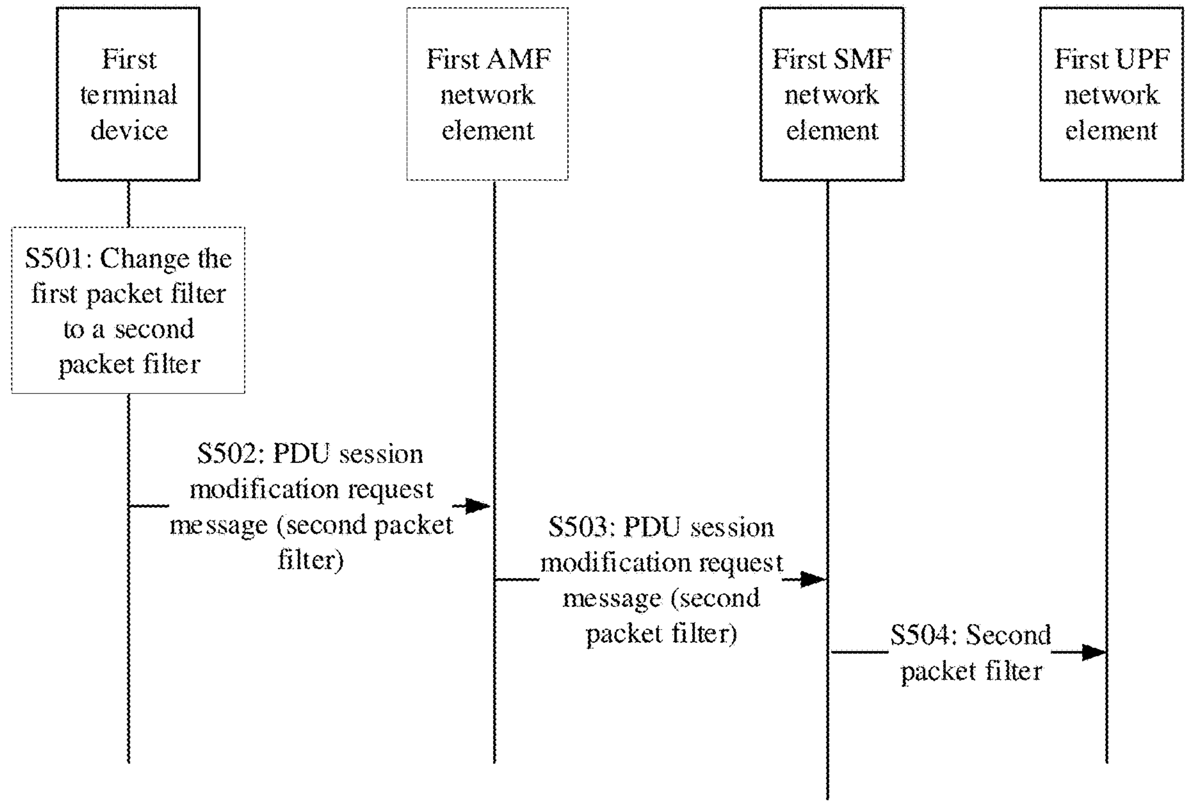

It may be understood that, the method embodiment in FIG. 2A and FIG. 2B describes a case in which the first terminal device determines in S208 that there is neither a PDU session corresponding to the first description information nor a QoS flow corresponding to the second description information, and the method embodiment in FIG. 4 describes a case in which there is a PDU session corresponding to the first description information but no QoS flow corresponding to the second description information. If the first terminal device determines in S208 that there is a PDU session corresponding to the first description information and there is a QoS flow corresponding to the second description information, the existent PDU session corresponding to the first description information is the second PDU session, and the existent QoS flow corresponding to the second description information is the second QoS flow. Then a specific process is shown in FIG. 5. In a method embodiment shown in FIG. 5, after S201 to S208 are performed, the following process is performed and includes the following steps.

S501: The first terminal device changes a first IP address of the first PDU session included in the first packet filter to a second IP address of a second PDU session, to obtain a second packet filter.

It may be understood that, if the first terminal device receives the first packet filter in S207, S501 is performed.

Optionally, S501 includes: The first terminal device changes the first IP address of the first PDU session included in the first packet filter to the second IP address of the second PDU session, and changes a first port number that is included in the first packet filter and that corresponds to the first IP address to a second port number corresponding to the second IP address, to obtain a second packet filter.

S502: The first terminal device sends a PDU session modification request message to the first AMF network element, where the PDU session modification request message includes the second packet filter.

Optionally, S502 includes: The first terminal device sends the PDU session modification request message to the first AMF network element, where the PDU session modification request message includes a QoS rule, and the QoS rule includes the second packet filter.

The PDU session modification request message in S502 corresponds to the second PDU session. In other words, the PDU session modification request message in S502 is to modify the PDU session that exists in the first terminal device and that corresponds to the first description information.

S503: The first AMF network element sends the PDU session modification request message in S502 to a first SMF network element, where the PDU session modification request message includes the second packet filter.

Optionally, S503 includes: The first AMF network element sends the PDU session modification request message in S502 to the first SMF network element, where the PDU session modification request message includes a QoS rule, and the QoS rule includes the second packet filter.

S504: The first SMF network element sends the second packet filter to a first UPF network element.

Optionally, S504 includes: The first SMF network element sends a QoS rule to the first UPF network element, where the QoS rule includes the second packet filter.

Optionally, S504 includes: The first SMF network element sends the second packet filter to the first UPF network element by using a PDI field in a PDR.

Optionally, in an alternative manner of S504, the first SMF network element exchanges a source IP address and a port number corresponding to the source IP address that are included in the second packet filter with a destination IP address and a port corresponding to the destination IP address that are included in the second packet filter, to obtain a third packet filter, and then the first SMF sends the third packet filter to the first UPF network element.

For example, the first packet filter is "IP 1, Port 1, IP3, Port 3, and TCP", where the IP 1 is the IP address of the first PDU session. After S212, the first packet filter is changed to the second packet filter "IP 2, Port 1, IP 3, Port 3, TCP", where the IP 2 is the IP address of the second PDU session, and the first SMF network element exchanges positions of the IP 2 and the Port 1 (the source IP address and the port number corresponding to the source IP address) with positions of the IP 3 and the Port 3 (the destination IP address and the port number corresponding to the destination IP address) in the second packet filter, to obtain the third packet filter "IP 3, Port 3, IP 2, Port 1, TCP".

Optionally, that the first SMF network element sends the third packet filter to the first UPF network element includes: The first SMF network element sends the third packet filter to the first UPF network element by using a PDI field in a PDR.

Optionally, the first SMF network element sends a QoS rule to the first UPF network element, where the QoS rule includes the third packet filter.

For steps after S504, refer to S215 to S220. It needs to be emphasized that, because there is no PDU session corresponding to the first description information in the processes shown in FIG. 2A, FIG. 2B, and FIG. 3, S215 needs to be performed after the second PDU session is established. There is a PDU session corresponding to the first description information in FIG. 5, and S215 may be performed after the first AMF network element receives the PDU session modification request message in S502. There is no limitation on a sequence between S215 and a step after S502.

In other words, FIG. 5 may be an embodiment in combination with FIG. 2A and FIG. 2B; and S201 to S208 in FIG. 2A and FIG. 2B, S501 to S504 in FIG. 5, and S215 to S220 in FIG. 2A and FIG. 2B may form an embodiment.

Optionally, in the method embodiments in FIG. 2A and FIG. 2B to FIG. 5, in S208, the first terminal device needs to determine, based on the first description information, whether there is a PDU session corresponding to the first description information; and determine, based on the second description information, whether there is a QoS flow corresponding to the second description information. In some embodiments, the first description information may not exist in the foregoing processes. In other words, in S203, the second terminal device may not send the identifier of the first PDU session to the second AMF network element; in S204, the second AMF network element also does not need to obtain the first description information based on the identifier of the first PDU session; in S206, the second AMF network element may not send the first description information to the first AMF network element; in S207, the first AMF network element may not send the first description information to the first terminal device; and in S208, the first terminal device may determine, based on the second description information, whether there is a QoS flow corresponding to the second description information. This scenario may be understood as transfer in a same PDU session: a terminal device that receives the data of the first service needs to be switched from the second terminal device to the first terminal device, and the related information about the PDU session does not need to be carried but only the related information about the QoS flow needs to be carried in a message.

In the embodiments in FIG. 2A and FIG. 2B to FIG. 5, the user may operate the second terminal device, to trigger the second terminal device to obtain the fourth identifier of the first terminal device. After obtaining the fourth identifier, the second terminal device sends at least one of the fourth identifier, the second identifier corresponding to the to-be-transferred first service, the identifier of the first QoS flow, the identifier of the first PDU session, or the first packet filter to the second AMF network element. The second AMF network element may obtain, based on the identifier of the first QoS flow, the second description information from the second SMF network element; and obtain, based on the identifier of the first PDU session, the first description information from the second SMF network element. The second AMF network element sends at least one of the fourth identifier, the first description information, the second description information, the second identifier, or the first packet filter to the first AMF network element. The first AMF network element determines the first terminal device based on the fourth identifier, and sends at least one of the first description information, the second description information, the second identifier, or the first packet filter to the first terminal device. The first terminal device determines, based on the first description information, whether there is a PDU session corresponding to the first description information; and determines, based on the second description information, whether there is a QoS flow corresponding to the second description information. The first terminal device sends the PDU session modification request message or the PDU session establishment request message to the first AMF network element based on whether there is a PDU session corresponding to the first description information and whether there is a QoS corresponding to the second description information, so as to determine the second PDU session and the second QoS flow, thereby making it possible to transfer the data of the first service.

The embodiments in FIG. 2A and FIG. 2B to FIG. 5 describe a case in which the second terminal device obtains the fourth identifier of the first terminal device. The following describes, with reference to an embodiment in FIG. 6A and FIG. 6B, a case in which the first terminal device obtains the third identifier of the second terminal device.

S601: A second UPF network element sends data of a first service to the second terminal device by using a first QoS flow; and the second terminal device receives, by using the first QoS flow, the data of the first service sent by the second UPF network element.

Specifically, for S601, refer to the description of S201. To avoid repetition, details are not described again.

S602: The first terminal device obtains the third identifier and/or a second identifier, where the third identifier is used to identify the second terminal device, and the second identifier is used to identify the first service.

In S602, the first terminal device may obtain the third identifier and/or the second identifier in any one of the following manners.

Manner 1: The first terminal device obtains the third identifier and/or the second identifier from the second terminal device.

Optionally, that the first terminal device obtains the third identifier and/or the second identifier from the second terminal device includes: The first terminal device sends a request message to the second terminal device by using Bluetooth; and the first terminal device receives the third identifier and/or the second identifier sent by the second terminal device, including: The first terminal device receives, by using Bluetooth, the third identifier and/or the second identifier sent by the second terminal device.

Optionally, that the first terminal device obtains the third identifier and/or the second identifier from the second terminal device includes: The first terminal device sends a request message to the second terminal device by using Wi-Fi; and the first terminal device receives the third identifier and/or the second identifier sent by the second terminal device, including: The first terminal device receives, by using Wi-Fi, the third identifier and/or the second identifier sent by the second terminal device.

Optionally, that the first terminal device obtains the third identifier and/or the second identifier from the second terminal device includes: The first terminal device sends a request message to the second terminal device by using sidelink; and the first terminal device receives the third identifier and/or the second identifier sent by the second terminal device, including: The first terminal device receives, by using sidelink, the third identifier and/or the second identifier sent by the second terminal device.

Optionally, that the first terminal device obtains the third identifier and/or the second identifier from the second terminal device includes: The first terminal device sends a request message to the second terminal device by using UWB; and the first terminal device receives the third identifier and/or the second identifier sent by the second terminal device, including: The first terminal device receives, by using UWB, the fourth identifier and/or the second identifier sent by the second terminal device.

Optionally, that the first terminal device obtains the third identifier and/or the second identifier from the second terminal device includes: The first terminal device sends a request message to the second terminal device by using an ultrasonic wave; and the first terminal device receives the third identifier and/or the second identifier sent by the second terminal device, including: The first terminal device receives, by using the ultrasonic wave, the third identifier and/or the second identifier sent by the second terminal device.

Optionally, that the first terminal device obtains the third identifier and/or the second identifier from the second terminal device includes: The first terminal device sends a request message to the second terminal device by using a specific communications system (for example, a 5G communications system or a 4G communications system); and the first terminal device receives the third identifier and/or the second identifier sent by the second terminal device, including: The first terminal device receives, by using the specific communications system, the third identifier and/or the second identifier sent by the second terminal device.

Manner 2: The first terminal device obtains the third identifier and/or the second identifier from a management network element, where the management network element is configured to manage the first terminal device and the second terminal device, and the management network element may store the third identifier of the second terminal device and/or the second identifier.

Optionally, the management network element may be a device management center, for example, a device management server at home or in a company; or the management network element may be an APP server, and the server is deployed in the internet.

Optionally, that the first terminal device obtains the third identifier and/or the second identifier from the management network element includes: The first terminal device may send a request message to the management network element, where the request message is used to request the identifier of the second terminal device and/or the second identifier of the first service from the management network element; and the first terminal device receives the third identifier and/or the second identifier sent by the management network element.

Optionally, that the first terminal device may send a request message to the management network element includes: The first terminal device sends the request message to the management network element by using Bluetooth; and the first terminal device receives the third identifier and/or the second identifier sent by the management network element, including: The first terminal device receives, by using Bluetooth, the third identifier and/or the second identifier sent by the management network element.

Optionally, that the first terminal device may send a request message to the management network element includes: The first terminal device sends the request message to the management network element by using Wi-Fi; and the first terminal device receives the third identifier and/or the second identifier sent by the management network element, including: The first terminal device receives, by using Wi-Fi, the third identifier and/or the second identifier sent by the management network element.

Optionally, that the first terminal device may send a request message to the management network element includes: The first terminal device sends the request message to the management network element by using sidelink; and the first terminal device receives the third identifier and/or the second identifier sent by the management network element, including: The first terminal device receives, by using sidelink, the third identifier and/or the second identifier sent by the management network element.

Optionally, that the first terminal device may send a request message to the management network element includes: The first terminal device sends the request message to the management network element by using UWB; and the first terminal device receives the third identifier and/or the second identifier sent by the management network element, including: The first terminal device receives, by using UWB, the third identifier and/or the second identifier sent by the management network element.

Optionally, that the first terminal device may send a request message to the management network element includes: The first terminal device sends the request message to the management network element by using an ultrasonic wave; and the first terminal device receives the third identifier and/or the second identifier sent by the management network element, including: The first terminal device receives, by using the ultrasonic wave, the third identifier and/or the second identifier sent by the management network element.

Optionally, that the first terminal device may send a request message to the management network element includes: The first terminal device sends the request message to the management network element by using a specific communications system (for example, a 5G communications system or a 4G communications system); and the first terminal device receives the third identifier and/or the second identifier sent by the management network element, including: The first terminal device receives, by using the specific communications system, the third identifier and/or the second identifier sent by the management network element.

Optionally, the first terminal device may obtain the second identifier from the second terminal device, and obtain the third identifier from the management network element; or the first terminal device obtains the third identifier from the second terminal device, and obtains the second identifier from the management network element. In other words, the first terminal device may obtain the second identifier and the third identifier from different devices.

Optionally, when the first terminal device obtains the third identifier and/or the second identifier from the management network element, the request message sent by the first terminal device to the management network element may carry a seventh identifier of the second terminal device. For example, the seventh identifier is allocated by the management network element to the second terminal device, but the first terminal device may store the seventh identifier allocated to the second terminal device by the management network element. In this way, the management network element sends, based on the seventh identifier, the seventh identifier of the second terminal device to the first terminal device. It may be understood that, the seventh identifier is used for the management network element and the first terminal device to identify the second terminal device, and is different from the third identifier of the second terminal device. The third identifier of the second terminal device may be understood as an identifier used by an operator to identify the second terminal device. In other words, when a same terminal device needs to be identified by different objects in different cases, different identifiers may be allocated to the terminal device. For example, when the second terminal device needs to be identified by the first terminal device and the management network element, an identifier of the second terminal device is the seventh identifier; and when the second terminal device needs to be identified by the operator, an identifier of the second terminal device may be the third identifier. For example, the seventh identifier may be a number allocated by the management network element to the second terminal device.

Optionally, the first terminal device may receive a first operation instruction; and in response to the first operation instruction, the first terminal device may obtain the third identifier and/or the second identifier. In other words, a user may operate the first terminal device, to trigger the first terminal device to obtain the third identifier and/or the second identifier. For example, the first terminal device is triggered to send a request message to the second terminal device or the management network element. Optionally, the first operation instruction entered by the user may specify the second terminal device, that is, the user expects to transfer the data of the first service, which is for transmission by the second terminal device, to the first terminal device for transmission.

Optionally, the first terminal device may spontaneously obtain the third identifier and/or the second identifier without involving a user operation. For example, if a distance between the second terminal device and the first terminal device is less than a preset value, the first terminal device obtains the third identifier; or the second terminal device is a default transferred-from device.

Optionally, the third identifier may be a GUTI of the second terminal device. Optionally, the GUTI of the second terminal device includes a GUAMI and a temporary mobile subscriber identity (TMSI) of the second terminal device.

Optionally, the third identifier may be an MSISDN of the second terminal device.

Optionally, the third identifier may be an IMSI of the second terminal device.

Optionally, the third identifier may be an IMEI of the second terminal device.

It may be understood that, in the method 600, the step of obtaining the third identifier may not exist, and the first terminal device may store the third identifier of the second terminal device and does not need to obtain the third identifier from the second terminal device or the management network element.

For a description of the second identifier, refer to the description of the method 200.

It may be understood that, the obtaining the second identifier may not exist in the method 600. This indicates that the second terminal device needs to transfer all services of the second terminal device to the first terminal device, and the first service may be all services of the second terminal device.

S603: The first terminal device sends the second identifier and/or the third identifier to a first AMF network element.

If the first terminal device obtains the second identifier in S602, the first terminal device sends the second identifier to the first AMF network element in S603. If the first terminal device obtains the third identifier in S602, the first terminal device sends the third identifier to the first AMF network element in S603. If the first terminal device obtains the second identifier and the third identifier in S602, the first terminal device sends the second identifier and the third identifier to the first AMF network element in S603. In S603, if the first terminal device sends the second identifier and the third identifier to the first AMF network element, the first terminal device may send, in one message, the second identifier and the third identifier; or may send, in different messages, the second identifier and the third identifier.

Optionally, S603 includes: The first terminal device sends a transfer request message to the first AMF network element, where the transfer request message includes the second identifier and/or the third identifier.

S604: The first AMF network element determines a second AMF network element based on the third identifier.

Optionally, if the third identifier is the GUTI of the second terminal device, the first AMF network element determines the second AMF network element based on the GUTI of the second terminal device. Optionally, the first AMF network element determines the second AMF network element based on the GUAMI included in the GUTI of the second terminal device.

Optionally, if the third identifier is the MSISDN, IMSI, or IMEI of the second terminal device, the first AMF network element sends the MSISDN, IMSI, or IMEI of the second terminal device to a UDM network element; the UDM network element determines the second AMF network element based on the MSISDN, IMSI, or IMEI of the second terminal device; and the UDM network element sends an identifier of the second AMF network element to the first AMF network element, where the UDM network element is a network element corresponding to the first AMF network element and the second AMF network element, or the UDM network element may be understood as a network element corresponding to the first terminal device and the second terminal device.

Optionally, if the first AMF network element and the second AMF network element are a same entity, in S604, the second AMF network element that is determined based on the third identifier by the first AMF network element may be a module or a unit that is of the same entity as the first AMF network element but is different from the first AMF network element. Certainly, the first AMF network element and the second AMF network element may be a same module or a same unit of a same entity. This is not limited in this embodiment of this application.

S605: The first AMF network element sends the third identifier and/or the second identifier to the second AMF network element.

If the first AMF network element receives the second identifier in S603, the first AMF network element sends the second identifier to the second AMF network element in S605. If the first AMF network element receives the third identifier in S603, the first AMF network element sends the third identifier to the second AMF network element in S605. If the first AMF network element receives the second identifier and the third identifier in S603, the first AMF network element sends the second identifier and the third identifier to the second AMF network element in S605. In S605, if the first AMF network element sends the second identifier and the third identifier to the second AMF network element, the first AMF network element may send, in one message, the second identifier and the third identifier; or may send, in different messages, the second identifier and the third identifier.

Optionally, S605 includes: The first AMF network element sends a transfer request to the second AMF network element, where the transfer request message includes the third identifier and/or the second identifier.

Optionally, if the second AMF network element and the first AMF network element are a same entity, that the first AMF network element sends the third identifier and/or the second identifier to the second AMF network element in S605 may be understood as: A module that belongs to the first AMF network element in the same entity transfers the third identifier and/or the second identifier to a module that belongs to the second AMF network element in the same entity; or may be understood as that: Step S605 does not exist, and the entity to which the second AMF network element and the first AMF network element belong stores the third identifier and/or the second identifier. In other words, if the second AMF network element and the first AMF network element are a same entity, it may be understood that there is a step of mutual sending, or it may be understood that there is no step of mutual sending. This is not limited in this embodiment of this application.

S606: The second AMF network element sends the second identifier to the second terminal device based on the third identifier.

In S606, the second AMF network element determines the second terminal device based on the third identifier, and sends the second identifier to the second terminal device.

If the second AMF network element receives the third identifier and the second identifier in S605, S606 is performed.

S607: The second terminal device determines, based on the second identifier, at least one of an identifier of the first QoS flow, an identifier of a first PDU session, or a first packet filter.

For descriptions of the identifier of the first QoS flow, the identifier of the first PDU session, or the first packet filter, refer to the descriptions of S203 in the method 200.

In other words, the first service identified by the second identifier corresponds to at least one of the identifier of the first QoS flow, the identifier of the first PDU session, or the first packet filter.

S608: The second terminal device sends at least one of the second identifier, the identifier of the first QoS flow, the identifier of the first PDU session, or the first packet filter to the second AMF network element.

S609: This step is the same as S204.

S610: The second AMF network element sends at least one of the second identifier, the first description information, the second description information, or the first packet filter to the first AMF network element.

Optionally, in S605, the first AMF network element sends a transfer request message to the second AMF network element, where the transfer request message includes the third identifier and/or the second identifier; and then S610 includes: The second AMF network element sends a response message for the transfer request message to the first AMF network element, where the response message for the transfer request message includes at least one of the second identifier, the first description information, the second description information, or the first packet filter.

S611: The first AMF network element sends at least one of the second identifier, the first description information, the second description information, or the first packet filter to the first terminal device.

Optionally, in S603, the first terminal device sends a transfer request message to the first AMF network element, where the transfer request message includes the second identifier and/or the third identifier; and then in S610, the first terminal device sends a response message for the transfer request message to the first AMF network element, where the response message for the transfer request message includes at least one of the second identifier, the first description information, the second description information, or the first packet filter.

Optionally, if the first AMF network element sends the second identifier to the first terminal device, the first terminal device starts, based on the second identifier, an application related to the first service, to prepare, in advance, for transferring the data of the first service.

For steps after S611, refer to steps after S208 in FIG. 2A and FIG. 2B to FIG. 5. To avoid repetition, details are not described again.

Figure 6A:
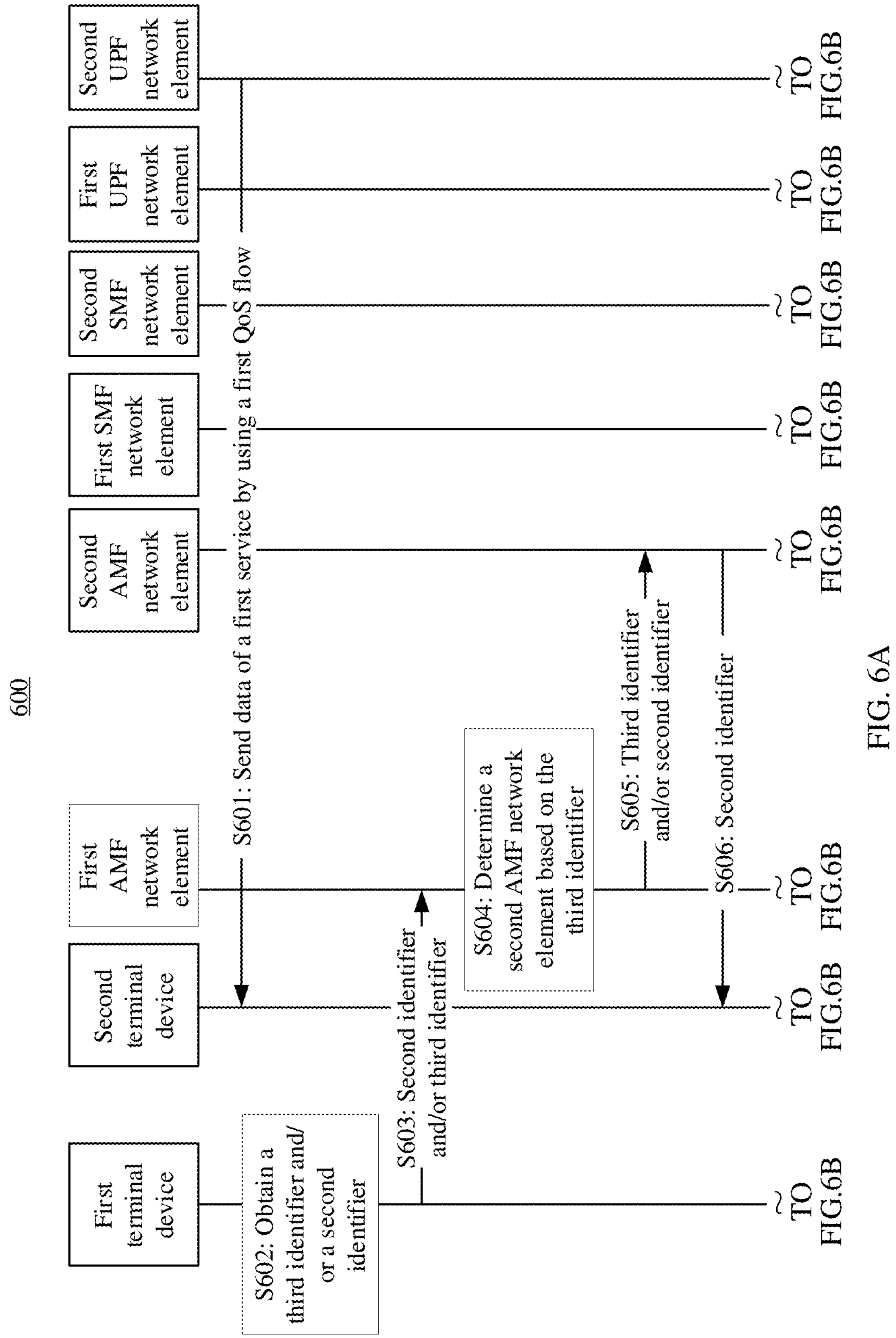
Figure 6B:
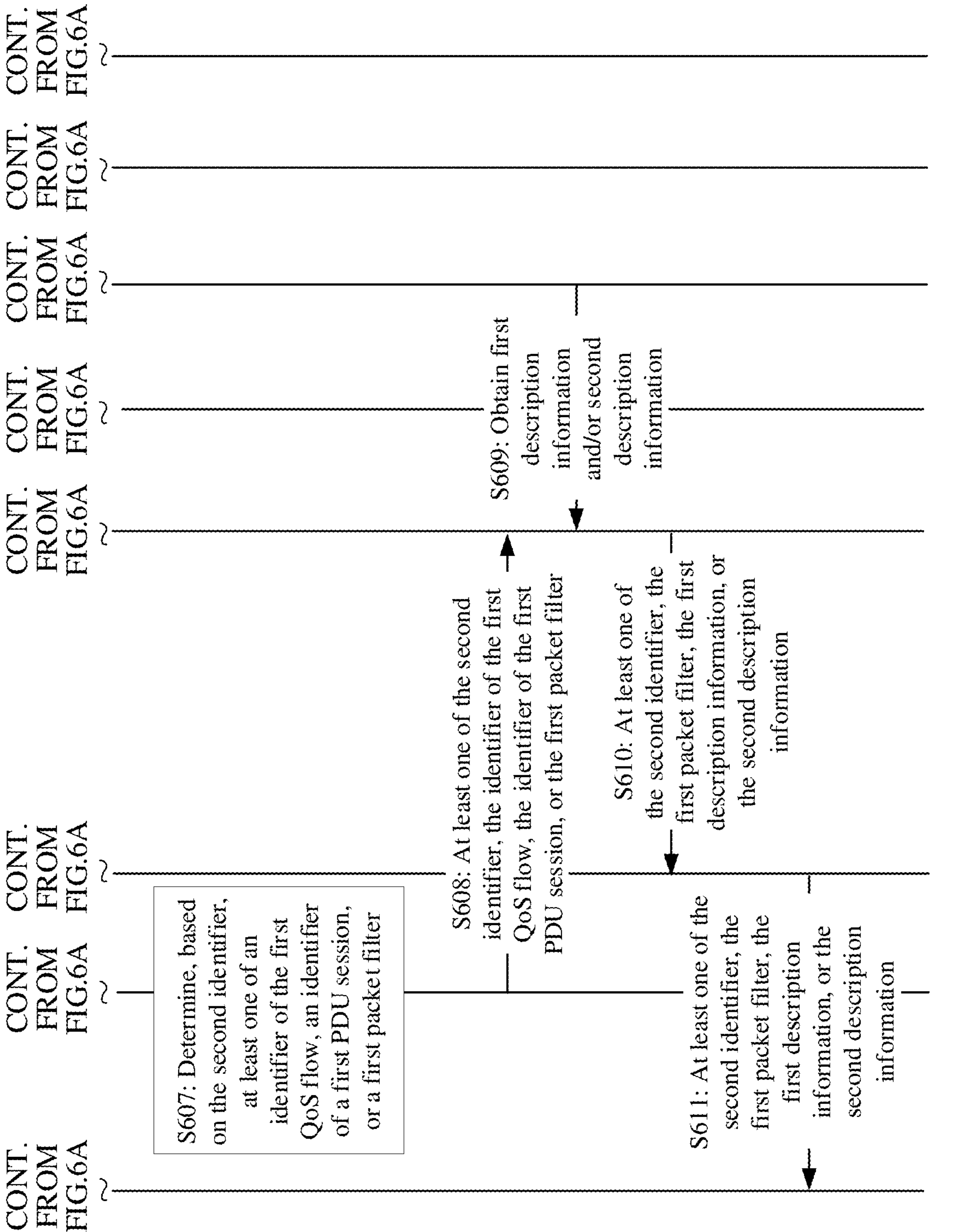

In the embodiment in FIG. 6A and FIG. 6B, the user may operate the first terminal device, to trigger the first terminal device to obtain the second identifier and/or the third identifier of the second terminal device. After obtaining the second identifier and/or the third identifier, the first terminal device may send the second identifier and/or the third identifier to the first AMF network element. The first AMF network element may determine the second AMF network element based on the third identifier, and send the third identifier and/or the second identifier to the second AMF network element. The second AMF network element determines the second terminal device based on the third identifier, and sends the second identifier to the second terminal device. The second terminal device determines, based on the second identifier, at least one of the identifier of the first QoS flow related to the first service, the identifier of the first PDU session, or the first packet filter; and sends at least one of the second identifier, the identifier of the first QoS flow, the identifier of the first PDU session, or the first packet filter to the second AMF network element. The second AMF network element may obtain, based on the identifier of the first QoS flow, the second description information from the second SMF network element; and obtain, based on the identifier of the first PDU session, the first description information from the second SMF network element. The second AMF network element sends at least one of the first description information, the second description information, the second identifier, or the first packet filter to the first AMF network element. The first AMF network element sends the at least one of the first description information, the second description information, the second identifier, or the first packet filter to the first terminal device. The first terminal device determines, based on the first description information, whether there is a PDU session corresponding to the first description information; and determines, based on the second description information, whether there is a QoS flow corresponding to the second description information. The first terminal device sends the PDU session modification request message or the PDU session establishment request message to the first AMF network element based on whether there is a PDU session corresponding to the first description information and whether there is a QoS corresponding to the second description information, so as to determine the second PDU session and the second QoS flow, thereby making it possible to transfer the data of the first service.

Optionally, in the foregoing embodiment, at least one of the first packet filter, the second packet filter, or the third packet filter may be understood as a packet filter corresponding to the first service; or understood as that: At least one of the first packet filter, the second packet filter, or the third packet filter is configured to perform transmission of the data of the first service. A QoS rule may be sent between any two of the foregoing devices, where the QoS rule may carry the first packet filter, the second packet filter, or the third packet filter. In other words, the first packet filter, the second packet filter, or the third packet filter may be sent between the two devices by sending a QoS rule.

It needs to be noted that, the names of the messages in the foregoing method embodiments are merely examples, and shall not constitute a limitation on embodiments of this application. For example, the transfer request message, the identification request message, and the request message are all examples for description, and the names of the messages may alternatively be other names. This is not limited in embodiments of this application.

It needs to be noted that, in different embodiments, the PDU session establishment request message or the PDU session modification request message carries different content. A person skilled in the art should not understand the PDU session establishment request message or the PDU session modification request message in the embodiments as a message that carries determined content. In other words, the PDU session establishment request message or the PDU session modification request message is merely a function description of the message, and messages with a same function may carry different content.

It needs to also be noted that, the first AMF network element and the second AMF network element described in the foregoing embodiments may be a same entity or may be different entities. If the first AMF network element and the second AMF network element may be a same entity, it may be understood that there is a step of mutual sending or there may be no step of mutual sending between the first AMF network element and the second AMF network element. The first UPF network element and the second UPF network element described in the foregoing embodiments may be a same entity or may be different entities. If the first UPF network element and the second UPF network element may be a same entity, it may be understood that there is a step of mutual sending or there may be no step of mutual sending between the first UPF network element and the second UPF network element.

It may be understood that, the foregoing method embodiments may be independent embodiments, or embodiments that may be combined with each other; and steps in different method embodiments may be combined into another embodiment, and steps in a same method embodiment may also be combined into another embodiment.

It may be understood that, the methods and operations implemented by the terminal devices in the foregoing method embodiments may alternatively be implemented by components (for example, chips or circuits) applicable to the terminal devices; and the methods and operations implemented by the network devices in the foregoing method embodiments may alternatively be implemented by components (for example, chips or circuits) applicable to the network devices.

The foregoing descriptions are for the method embodiments provided in this application. The following describes apparatus embodiments provided in this application. It needs to be understood that descriptions of apparatus embodiments correspond to the descriptions of the method embodiments. Therefore, for content that is not described in detail, refer to the method embodiments. For brevity, related details are not described herein again.

Figure 7:
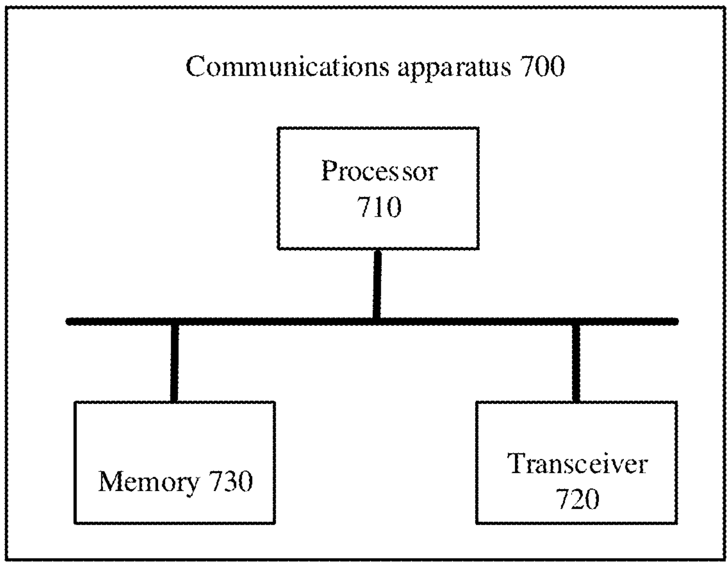
FIG. 7 is a schematic diagram of a data transmission apparatus according to an embodiment of this application.

FIG. 7 shows a communications apparatus 700 according to an embodiment of this application. The communications apparatus 700 includes a processor 710 and a transceiver 720. The processor 710 and the transceiver 720 communicate with each other by using an internal connection channel, and the processor 710 is configured to execute instructions, to control the transceiver 720 to send a signal and/or receive a signal.

Optionally, the communications apparatus 700 may further include a memory 730. The memory 730 communicates with the processor 710 and the transceiver 720 by using an internal connection channel. The memory 730 is configured to store instructions, and the processor 710 may execute the instructions stored in the memory 730.

In a possible implementation, the communications apparatus 700 is configured to implement procedures and steps corresponding to the first terminal device in the method embodiments.

In a possible implementation, the communications apparatus 700 is configured to implement procedures and steps corresponding to the first SMF network element in the method embodiments.

In a possible implementation, the communications apparatus 700 is configured to implement procedures and steps corresponding to the first UPF network element in the method embodiments.

In a possible implementation, the communications apparatus 700 is configured to implement procedures and steps corresponding to the second terminal device in the method embodiments.

In a possible implementation, the communications apparatus 700 is configured to implement procedures and steps corresponding to the second AMF network element in the method embodiments.

In a possible implementation, the communications apparatus 700 is configured to implement procedures and steps corresponding to the second UPF network element in the method embodiments.

It needs to be understood that, the communications apparatus 700 may be specifically the first terminal device, the first AMF network element, the first UPF network element, the second terminal device, the second AMF network element, or the second UPF network element in the foregoing embodiments; or may be a chip or a chip system. Correspondingly, the transceiver 720 may be a transceiver circuit of the chip. This is not limited herein. Specifically, the communications apparatus 700 may be configured to perform steps and/or procedures corresponding to the first terminal device, the first AMF network element, the first UPF network element, the second terminal device, the second AMF network element, or the second UPF network element in the method embodiments. Optionally, the memory 730 may include a read-only memory and a random access memory, and provides instructions and data for the processor. A part of the memory may further include a nonvolatile random access memory. For example, the memory may further store information about a device type. The processor 710 may be configured to execute the instructions stored in the memory; and when the processor 710 executes the instructions stored in the memory, the processor 710 is configured to perform the steps and/or procedures corresponding to the first terminal device, the first AMF network element, the first UPF network element, the second terminal device, the second AMF network element, or the second UPF network element in the method embodiments.

In an implementation process, the steps in the foregoing methods may be completed by an integrated logic circuit of hardware in a processor, or by using instructions in a form of software. The steps of the methods disclosed with reference to embodiments of this application may be directly implemented by a hardware processor, or may be implemented by using a combination of hardware in a processor and a software module. The software module may be located in a mature storage medium in the art, such as a random access memory, a flash memory, a read-only memory, a programmable read-only memory, an electrically erasable programmable memory, or a register. The storage medium is located in a memory. The processor reads information in the memory and completes the steps of the foregoing methods in combination with hardware of the processor. To avoid repetition, details are not described herein again.

It needs to be noted that the processor in this embodiment of this application may be an integrated circuit chip and has a signal processing capability. In an implementation process, the steps in the method embodiments may be completed by an integrated logic circuit of hardware in a processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps, and logical block diagrams disclosed in embodiments of this application. The general-purpose processor may be a microprocessor, or the processor may be any processor or the like. The steps of the methods disclosed with reference to embodiments of this application may be directly executed and completed by a hardware decoding processor, or may be executed and completed by using a combination of hardware in a decoding processor and a software module. The software module may be located in a mature storage medium in the art, such as a random access memory, a flash memory, a read-only memory, a programmable read-only memory, an electrically erasable programmable memory, or a register. The storage medium is located in a memory. The processor reads information in the memory and completes the steps of the foregoing methods in combination with hardware of the processor.

It may be understood that the memory in this embodiment of this application may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. In an example description but not a restrictive description, RAMs in many forms may be used, for example: a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct Rambus random access memory (direct rambus RAM, DR RAM). It needs to be noted that the memory in the systems and methods described in this specification includes but is not limited to these and any memory of another proper type.

According to the methods provided in embodiments of this application, this application further provides a computer program product. The computer program product includes computer program code. When the computer program code runs on a computer, the computer is enabled to perform the steps or procedures performed by the first terminal device, the first AMF network element, the first UPF network element, the second terminal device, the second AMF network element, or the second UPF network element in the method embodiments.

According to the methods provided in embodiments of this application, this application further provides a computer-readable storage medium. The computer-readable storage medium stores program code. When the program code runs on a computer, the computer is enabled to perform the steps or procedures performed by the first terminal device, the first AMF network element, the first UPF network element, the second terminal device, the second AMF network element, or the second UPF network element in the method embodiments.

According to the methods provided in embodiments of this application, this application further provides a communications system, including at least two of the first terminal device, the second terminal device, the first AMF network element, the second AMF network element, the first UPF network element, the second UPF network element, the first SMF network element, or the second SMF network element.

The apparatus embodiments correspond to the method embodiments, where a corresponding module or unit performs a corresponding step. For example, a communications unit (a transceiver) performs a receiving step or a sending step in the method embodiments, and a processing unit (a processor) may perform steps other than the sending step and the receiving step. A function of a specific unit may be based on a corresponding method embodiment. There may be one or more processors.

In this application, "indicate" may include a direct indication and an indirect indication, or may include an explicit indication and an implicit indication. Information indicated by using a piece of information is referred to as to-be-indicated information. In a specific implementation process, the to-be-indicated information may be indicated in a plurality of manners, for example, but not limited to, a manner of directly indicating the to-be-indicated information. For example, the to-be-indicated information or an index of the to-be-indicated information is indicated. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is known or pre-agreed on. For example, specific information may alternatively be indicated by using an arrangement sequence of a plurality of pieces of information that is pre-agreed on (for example, stipulated in a protocol), to reduce indication overheads to some extent.

In embodiments of this application, the terms and abbreviations are all examples given for ease of description, and shall not constitute any limitation on this application. This application does not exclude a possibility of defining another term that can implement a same or similar function in an existing or future protocol.

It needs to be understood that, in this specification, "and/or" describes an association relationship between associated objects, and indicates that three relationships may exist. For example, A and/or B may indicate the following three cases: Only A exists, both A and B exist, and only B exists, where A and B may be singular or plural. The character "/" generally indicates an "or" relationship between the associated objects.

A person of ordinary skill in the art may be aware that, in combination with illustrative logical blocks (illustrative logical blocks) and steps (steps) described in embodiments disclosed in this specification, this application may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for detailed working processes of the foregoing systems, apparatuses, and units, refer to corresponding processes in the method embodiments. Details are not described herein again.

In the embodiments provided in this application, it needs to be understood that the disclosed systems, apparatuses, and methods may be implemented in other manners. For example, the described apparatus embodiments are merely examples. For example, division into units is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented by using some interfaces. Indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected depending on actual requirements to achieve the objectives of the solutions in the embodiments.

In addition, functional units in embodiments of this application may be integrated into one processing unit, each of the units may exist alone physically, or two or more units may be integrated into one unit.

In the foregoing embodiments, all or some of functions of the functional units may be implemented by software, hardware, firmware, or any combination thereof. When software is used for implementation, all or some of the functions may be implemented in a form of a computer program product. The computer program product includes one or more computer instructions (or programs). When the computer program instructions (or programs) are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device integrating one or more usable media, for example, a server or a data center. The usable medium may be a magnetic medium (for example, a floppy disk, a hard disk, or a magnetic tape), an optical medium (for example, a DVD), a semiconductor medium (for example, a solid state disk (solid state disk, SSD)), or the like.

When the functions are implemented in the form of a software functional unit and sold or used as an independent product, the functions may be stored in a computer-readable storage medium. Based on such an understanding, the technical solutions of this application essentially, or the part contributing to a current technology, or some of the technical solutions may be implemented in a form of a software product. The computer software product is stored in a storage medium and includes several instructions for instructing a computer device (which may be a personal computer, a server, or a network device, or the like) to perform all or some of the steps of the methods described in embodiments of this application. The storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, and the method comprises:

receiving information about a first quality of service (QoS) flow from a first access and mobility management function (AMF) network element, wherein the first QoS flow is useable by a second terminal device to receive data of a first service, and the first AMF network element is configured to serve a first terminal device; and receiving the data of the first service by a second QoS flow and causing the data of the first service to be transferred from the second terminal device to the first terminal device, wherein the second QoS flow is determined based on the information about the first QoS flow.

2. The method according to claim 1, wherein the method further comprises:

determining, based on the information about the first QoS flow, whether there is at least one of a protocol data unit (PDU) session or a QoS flow corresponding to the information about the first QoS flow; and sending, based on whether there is at least one of the PDU session or a QoS flow corresponding to the information about the first QoS flow, a PDU session modification request message or a PDU session establishment request message to the first AMF network element.

3. The method according to claim 2, wherein the information about the first QoS flow comprises at least one of first description information of a first PDU session corresponding to the first QoS flow or second description information of the first QoS flow; and the first description information comprises at least one of:

a data network name (DNN) of the first PDU session, a session and service continuity (SSC) mode of the first PDU session, or single network slice selection assistance information (S-NSSAI) of the first PDU session; and the second description information comprises at least one of:

a QoS identifier of the first QoS flow, a guaranteed bit rate of the first QoS flow, a guaranteed flow bit rate of the first QoS flow, a maximum flow bit rate of the first QoS flow, or an averaging window of the first QoS flow.

4. The method according to claim 3, wherein the determining, based on the information about the first QoS flow, whether there is at least one of the PDU session or a QoS flow corresponding to the information about the first QoS flow comprises:

determining, based on the first description information, whether there is a PDU session corresponding to the first description information in response to the information about the first QoS flow comprising the first description information;

determining, based on the second description information, whether there is a QoS flow corresponding to the second description information in response to the information about the first QoS flow comprising the second description information; or determining, based on the first description information, whether there is the PDU session corresponding to the first description information, and determining, based on the second description information, whether there is the QoS flow corresponding to the second description information in response to the information about the first QoS flow comprising the first description information and the second description information.

5. The method according to claim 3, wherein the sending, based on whether there is at least one of the PDU session or a QoS flow corresponding to the information about the first QoS flow, the PDU session modification request message or the PDU session establishment request message to the first AMF network element comprises:

sending the PDU session modification request message to the first AMF network element in response to determining that there is a PDU session corresponding to the first description information and no QoS flow corresponding to the second description information, wherein the PDU session modification request message comprises the second description information, and the second description information is useable to establish the second QoS flow;

sending the PDU session establishment request message to the first AMF network element and sending the PDU session modification request message to the first AMF network element in response to determining that there is no PDU session corresponding to the first description information, wherein the PDU session establishment request message comprises the first description information, the first description information is useable to establish a second PDU session corresponding to the second QoS flow; wherein the PDU session modification request message comprises the second description information, and the second description information is useable to establish the second QoS flow;

sending the PDU session establishment request message to the first AMF network element in response to determining that there is no PDU session corresponding to the first description information, wherein the PDU session establishment request message comprises the first description information and the second description information, the first description information is useable to establish the second PDU session corresponding to the second QoS flow, and the second description information is useable to establish the second QoS flow; or sending the PDU session modification request message to the first AMF network element in response to determining that there is the PDU session corresponding to the first description information and a QoS flow corresponding to the second description information, wherein the PDU session modification request message is useable to update a packet filter corresponding to the second QoS flow.

6. A data transmission method, comprising:

obtaining, by a first access and mobility management function (AMF) network element, information about a first quality of service (QoS) flow from a second AMF network element, wherein the first QoS flow is useable by a second terminal device to receive data of a first service, the first AMF network element is configured to serve a first terminal device, and the second AMF network element is configured to serve the second terminal device; and sending the information about the first QoS flow to the first terminal device, wherein the information about the first QoS flow is useable to obtain a second QoS flow, and the second QoS flow is useable by the first terminal device to receive the data of the first service.

7. The method according to claim 6, further comprising:

receiving a protocol data unit (PDU) session modification request message or a PDU session establishment request message from the first terminal device based on the information about the first QoS flow; and sending the PDU session modification request message or the PDU session establishment request message to a first session management function (SMF) network element, wherein the first SMF network element is configured to serve the first terminal device.

8. The method according to claim 7, wherein the information about the first QoS flow comprises at least one of first description information of a first PDU session corresponding to the first QoS flow or second description information of the first QoS flow; and the first description information comprises at least one of:

a data network name (DNN) of the first PDU session, a session and service continuity (SSC) mode of the first PDU session, or single network slice selection assistance information (S-NSSAI) of the first PDU session; and the second description information comprises at least one of:

a quality of service identifier of the first QoS flow, a guaranteed bit rate of the first QoS flow, a guaranteed flow bit rate of the first QoS flow, a maximum flow bit rate of the first Qos flow, or an averaging window of the first QoS flow.

9. The method according to claim 8, wherein the PDU session modification request message comprises the second description information, and the second description information is useable to establish the second QoS flow;

the PDU session modification request message is useable to update a packet filter of the second QoS flow;

the PDU session establishment request message comprises the first description information, the first description information is useable to establish a second PDU session corresponding to the second QoS flow, the PDU session modification request message comprises the second description information, and the second description information is useable to establish the second QoS flow; or the PDU session establishment request message comprises the first description information and the second description information, the first description information is useable to establish the second PDU session corresponding to the second QoS flow, and the second description information is useable to establish the second QoS flow.

10. The method according to claim 8, further comprising:

sending a first packet filter of the first service to the first terminal device, wherein the first packet filter comprises a first internet protocol (IP) address of the first PDU session corresponding to the first QoS flow;

receiving a second packet filter of the first terminal device, wherein the second packet filter comprises a second IP address of the second PDU session corresponding to the second QoS flow; and sending the second packet filter to the first SMF network element.

11. The method according to claim 6, further comprising:

obtaining, from the second AMF network element, at least one of identification information of a second session management function (SMF) network element of the second terminal device or identification information of a second user plane function (UPF) network element of the second terminal device, wherein the identification information of the second SMF network element is useable to identify the second SMF network element, the identification information of the second UPF network element is useable to identify the second UPF network element, the second SMF network element is configured to serve the second terminal device, and the second UPF network element is configured to serve the second terminal device;

sending a first identifier to the first terminal device; and receiving the first identifier from the first terminal device; and based on the received first identifier, at least one of determining the second SMF network element as the first SMF network element of the first terminal device, or determining the second UPF network element as a first UPF network element of the first terminal device.

12. The method according to claim 6, further comprising:

sending a second internet protocol (IP) address of a second PDU session corresponding to the second QoS flow or a third IP address of a first user plane function (UPF) network element of the first terminal device to the second AMF network element.

13. The method according to claim 6, further comprising:
receiving a second identifier from the second AMF network element, wherein the second identifier is useable to identify the first service; and
sending the second identifier to the first terminal device.

14. The method according to claim 6, wherein
in response to the third identifier being a globally unique temporary identifier (GUTI) of the second terminal device,
the method further comprises:
determining the second AMF network element based on the GUTI of the second terminal device.

15. The method according to claim 6, wherein
in response to the third identifier being a mobile subscriber international (ISDN) number (MSISDN) of the second terminal device, method further comprises:
determining, from a unified data management (UDM) network element, the second AMF network element based on the MSISDN of the second terminal device, wherein the UDM network element corresponds to the first AMF network element and the second AMF network element.

16. A data transmission method, comprising:
receiving, by a second user plane function (UPF) network element, data of a first service, the second UPF network element is configured to serve a second terminal device; and
sending the data of the first service to a first terminal device by a second quality of service (QoS) flow of a first UPF network element, wherein the first UPF network element is configured to serve the first terminal device, wherein
the second UPF network element and the second terminal device are configured to perform transmission of the data of the first service by a first QoS flow, and the second QoS flow is determined based on information about the first QoS flow.

17. The method according to claim 16, comprising:
receiving a second internet protocol (IP) address that is of a second PDU session corresponding to the second QoS flow from a second session management function (SMF) network element, wherein the second SMF network element is configured to serve the second terminal device; and
changing a destination address of the data of the first service to the second IP address of the second PDU session.

18. The method according to claim 16, further comprising:
receiving a third internet protocol (IP) address of the first UPF network element from the second session management function (SMF) network element, wherein the second SMF network element is configured to serve the second terminal device; and
determining to send the data of the first service to the first UPF network element based on the third IP address of the first UPF network element.

19. A communications apparatus, comprising:
a processor and a memory, wherein the processor is coupled to the memory, the memory is configured to store non-transitory instructions, and in response to the processor being configured to execute the non-transitory instructions thereby causes the communications apparatus to perform operations comprising:
receiving information about a first quality of service (QoS) flow from a first access and mobility management function (AMF) network element, wherein the first QoS flow is useable by a second terminal device to receive data of a first service, and the first AMF network element is configured to serve a first terminal device; and
receiving the data of the first service by a second QoS flow and causing the data of the first service to be transferred from the second terminal device to the first terminal device, wherein the second QoS flow is determined based on the information about the first QoS flow.

20. A non-transitory computer-readable storage medium including non-transitory instructions executable by a communications apparatus to cause the communications apparatus to perform operations comprising:
receiving information about a first quality of service (QoS) flow from a first access and mobility management function (AMF) network element, wherein the first QoS flow is useable by a second terminal device to receive data of a first service, and the first AMF network element is configured to serve a first terminal device; and
receiving the data of the first service by a second QoS flow and causing the data of the first service to be transferred from the second terminal device to the first terminal device, wherein the second QoS flow is determined based on the information about the first QoS flow.

* * * * *